United States Patent
Braedt

(10) Patent No.: US 11,713,096 B2
(45) Date of Patent: Aug. 1, 2023

(54) COAXIAL GEARSHIFT MECHANISM CONNECTION

(71) Applicant: SRAM DEUTSCHLAND GmbH, Schweinfurt (DE)

(72) Inventor: Henrik Braedt, Hambach (DE)

(73) Assignee: SRAM DEUTSCHLAND GmbH, Schweinfurt (DE)

( * ) Notice: Subject to any disclaimer, the term of this patent is extended or adjusted under 35 U.S.C. 154(b) by 560 days.

(21) Appl. No.: 16/824,204

(22) Filed: Mar. 19, 2020

(65) Prior Publication Data

US 2020/0298933 A1 Sep. 24, 2020

(30) Foreign Application Priority Data

Mar. 22, 2019 (DE) ...................... 10 2019 002 042.1

(51) Int. Cl.
  *B62M 9/125* (2010.01)
  *B62M 9/1242* (2010.01)
  *B62M 9/126* (2010.01)
  *B62M 9/124* (2010.01)

(52) U.S. Cl.
  CPC ............ *B62M 9/125* (2013.01); *B62M 9/126* (2013.01); *B62M 9/1242* (2013.01); *B62M 2009/12406* (2013.01)

(58) Field of Classification Search
  CPC .... B62M 9/121; B62M 9/124; B62M 9/1242; B62M 9/1244; B62M 9/125; B62M 9/126; B62M 2009/12406; B62M 2009/12413
  See application file for complete search history.

(56) References Cited

U.S. PATENT DOCUMENTS

| | | | | |
|---|---|---|---|---|
| 4,690,663 A | * | 9/1987 | Nagano | B62M 9/125 474/80 |
| 5,518,456 A | | 5/1996 | Kojima et al. | |
| 5,931,753 A | * | 8/1999 | Ichida | B62M 9/1244 474/82 |
| 7,033,294 B2 | * | 4/2006 | Chamberlain | B62J 13/00 474/80 |
| 7,090,603 B2 | * | 8/2006 | Shahana | B62M 9/125 474/80 |

(Continued)

FOREIGN PATENT DOCUMENTS

| | | |
|---|---|---|
| CN | 108622302 | 10/2018 |
| CN | 110386220 | 10/2019 |

(Continued)

*Primary Examiner* — Michael R Mansen
*Assistant Examiner* — Raveen J Dias

(57) ABSTRACT

A rear gearshift mechanism for installation on a bicycle frame coaxial with a rear-wheel axis has a base element, a pivot mechanism, a movable element and a chain guide. The base element includes an attachment end for installation on the bicycle frame. A first arm and a second arm of the attachment end are arranged spaced apart from one another in an axial direction and, by an associated adapter which has a thread, are configured for the installation of the gearshift mechanism on an associated bracket portion, in particular a dropout or frame hanger. The first arm is arranged on an inner side of the bracket portion, and the second arm is arranged on an outer side of the bracket portion. The base element is designed with a setting device by which the base element can be pivoted in a chain tensioning direction.

21 Claims, 25 Drawing Sheets

(56) References Cited

U.S. PATENT DOCUMENTS

| | | | | |
|---|---|---|---|---|
| 7,166,048 B2* | 1/2007 | Shahana | B62J 23/00 | 474/82 |
| 7,189,172 B2* | 3/2007 | Shahana | B62M 9/125 | 474/80 |
| 7,207,914 B2* | 4/2007 | Chamberlain | B62M 9/128 | 474/144 |
| 7,905,804 B2* | 3/2011 | Yamaguchi | B62M 9/125 | 474/80 |
| 9,010,792 B2* | 4/2015 | Talavasek | B62M 9/125 | 280/288.4 |
| 9,334,016 B2* | 5/2016 | Shahana | B62M 9/121 | |
| 10,870,464 B2* | 12/2020 | Braedt | B62M 9/125 | |
| 10,981,626 B2* | 4/2021 | Braedt | B62M 9/12 | |
| 11,148,755 B2* | 10/2021 | Kamada | B62M 9/16 | |
| 11,230,350 B2* | 1/2022 | Braedt | B62K 25/02 | |
| 2004/0110586 A1* | 6/2004 | Shahana | B62J 23/00 | 474/80 |
| 2004/0110587 A1* | 6/2004 | Shahana | B62J 23/00 | 474/82 |
| 2004/0116222 A1* | 6/2004 | Shahana | B62M 9/125 | 474/82 |
| 2004/0254038 A1* | 12/2004 | Chamberlain | B62M 9/128 | 474/82 |
| 2006/0189424 A1* | 8/2006 | Chamberlain | B62M 9/12 | 474/82 |
| 2007/0026985 A1 | 2/2007 | Yamaguchi | | |
| 2007/0191160 A1* | 8/2007 | Chamberlain | B62J 23/00 | 474/82 |
| 2008/0051237 A1* | 2/2008 | Shahana | B62M 9/1244 | 474/82 |
| 2008/0064544 A1* | 3/2008 | Yamaguchi | B62M 9/125 | 474/82 |
| 2013/0241175 A1* | 9/2013 | Talavasek | B62M 6/60 | 280/288.4 |
| 2014/0018199 A1* | 1/2014 | Shahana | B62M 9/126 | 474/82 |
| 2015/0225038 A1* | 8/2015 | Talavasek | B62K 19/30 | 180/220 |
| 2016/0039494 A1* | 2/2016 | Mikesell | B62K 3/02 | 474/82 |
| 2018/0265169 A1* | 9/2018 | Braedt | B62M 9/128 | |
| 2019/0291818 A1* | 9/2019 | Braedt | B62M 9/12 | |
| 2019/0322333 A1* | 10/2019 | Braedt | B62K 25/02 | |
| 2020/0017169 A1* | 1/2020 | Kamada | B62M 9/126 | |
| 2020/0062343 A1* | 2/2020 | Braedt | B62M 9/125 | |
| 2020/0339220 A1* | 10/2020 | Boehm | B62M 9/1242 | |
| 2021/0054929 A1* | 2/2021 | Braedt | B62M 9/124 | |
| 2021/0070395 A1* | 3/2021 | Braedt | B62M 9/1242 | |
| 2021/0188396 A1* | 6/2021 | Braedt | B62K 25/02 | |
| 2021/0339822 A1* | 11/2021 | Roman | B62K 25/286 | |
| 2022/0177075 A1* | 6/2022 | Braedt | B62M 9/125 | |
| 2022/0204134 A1* | 6/2022 | Shahana | B62M 9/128 | |
| 2022/0204135 A1* | 6/2022 | Shahana | B62M 9/1242 | |

FOREIGN PATENT DOCUMENTS

| | | | |
|---|---|---|---|
| DE | 202006003055 | 9/2006 | |
| DE | 102010032721 | 1/2012 | |
| DE | 102018001253 | 9/2018 | |
| DE | 102018001253 A1 * | 9/2018 | ............ B62K 25/02 |
| DE | 102018116381 | 1/2019 | |
| DE | 102018206104 | 10/2019 | |
| EP | 0875444 | 11/1998 | |
| EP | 1342658 | 9/2003 | |
| EP | 1764297 | 3/2007 | |
| EP | 2301835 | 3/2011 | |
| EP | 3388324 | 10/2018 | |

* cited by examiner

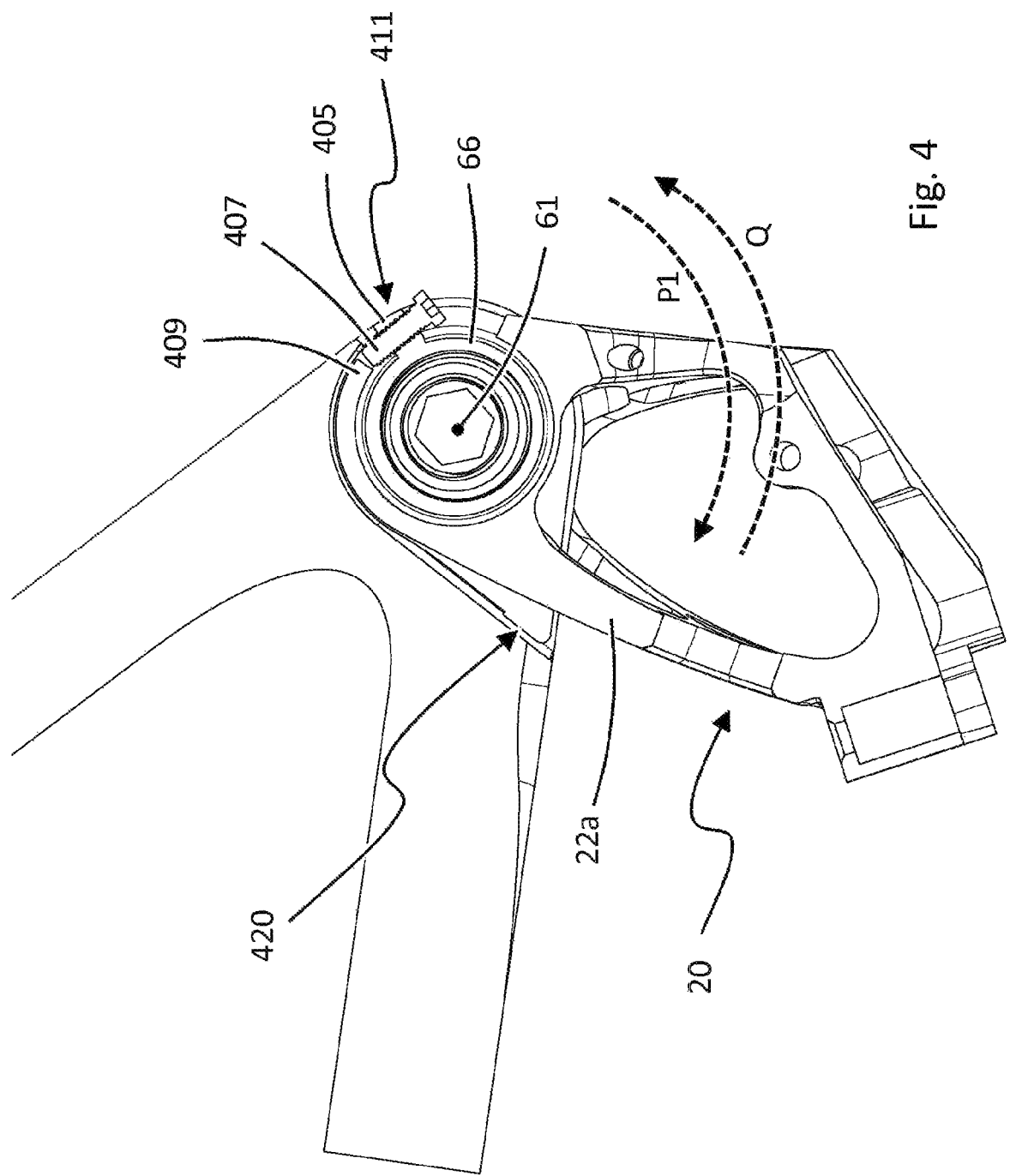

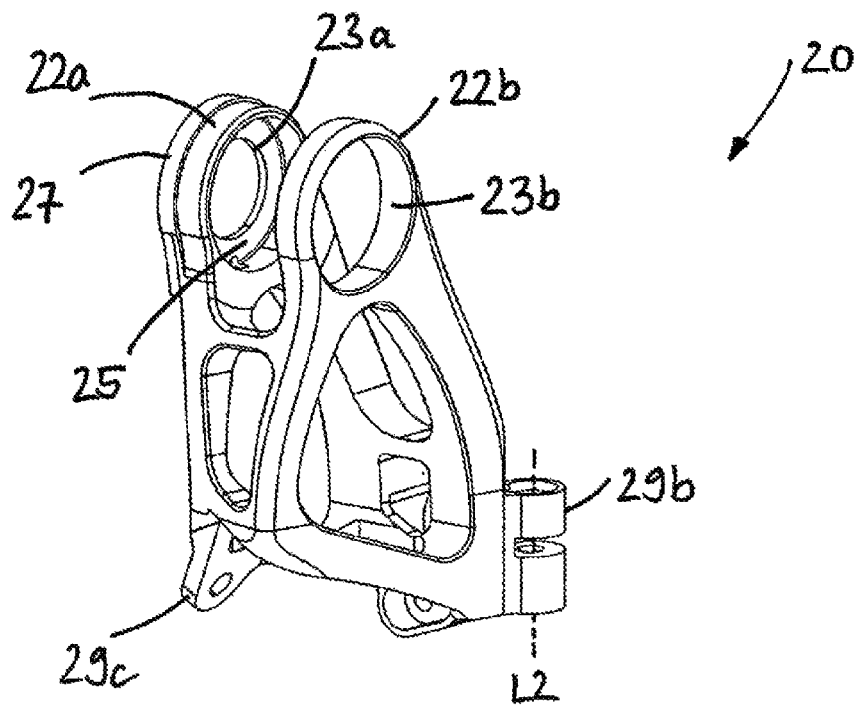
Fig. 23a
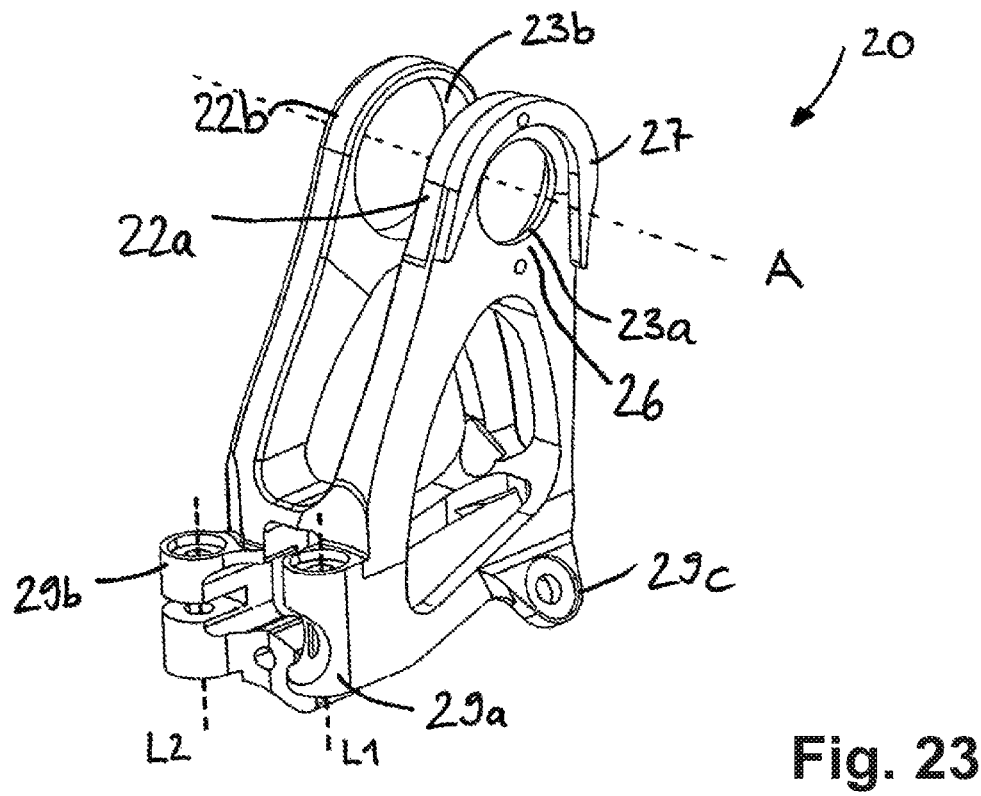
Fig. 23b
Fig. 23

COAXIAL GEARSHIFT MECHANISM CONNECTION

PRIORITY

This application claims priority to, and/or the benefit of, German patent application DE 10 2019 002 042.1, filed on Mar. 22, 2019 and German patent application DE 10 2020 201 229.6, filed on Jan. 31, 2020, the contents of both DE 10 2019 002 042.1 and DE 10 2020 201 229.6 are included by reference herein in their entirety.

BACKGROUND

A bicycle may be equipped with a drive arrangement, for example a chain drive. Bicycle drive arrangements may be used to transmit the torque from a rider to a rear wheel in order to drive the bicycle. A drive arrangement can for example transmit the torque from a front sprocket arrangement via a chain to a rear sprocket or pinion, for example a pinion of a so-called pinion cassette or of a so-called pinion assembly, in order to drive a rear wheel. A drive arrangement of said type may be referred to as drivetrain.

Sprocket assemblies for bicycles may have one or more individual sprockets. The front sprockets are generally referred to as chain wheels. Chain wheels may be fastened by a variety of different fastening devices. A chain wheel may for example be fastened by chain wheel screws or installed directly on the crank of a bicycle. The rear sprockets are commonly referred to as pinions. A multiplicity of rear sprockets or pinions may be referred to as a cassette, pinion cassette or pinion assembly. Such a cassette is typically configured such that it can be fastened to a freewheel part of a rear wheel. A cassette may for example be fastened to a freewheel body of a rear wheel by a wedge-type and/or threaded connection.

The alignment of a front chain wheel group with a rear pinion cassette influences the performance of the chain. For example, a front chain wheel assembly may have a single chain wheel which is aligned with a particular pinion of the rear pinion cassette. If the chain connects the individual chain wheel to said substantially aligned individual rear pinion, the chain is subjected to little or no lateral loading. However, if the chain is moved laterally to another pinion of the cassette, for example by a rear derailleur or a rear gearshift mechanism of a derailleur system of the drivetrain, the chain is subjected to a certain degree of lateral loading. Corresponding lateral loading of the chain arises if the front chain wheel assembly has multiple chain wheels, between which the chain is moved by a front derailleur or a front gearshift mechanism of the derailleur system.

For good performance of such a derailleur system, correct positioning and alignment especially of the rear gearshift mechanism on the frame of the bicycle is also of major significance. It has been identified that coaxial alignment features can be implemented in the drive arrangement. For example, an individual component may serve as a reference for the alignment of various other components of the drive arrangement. For example, both a gearshift mechanism and a cassette may be aligned coaxially with respect to an axle. The alignment of a component of the drivetrain, such as said axle, can reduce the inaccuracies in various applications owing to tolerance variations of the wheels or of the frame. The coaxial alignment of the gearshift mechanism with the cassette may also make it easier to realize a uniform radial spacing between parts of the gearshift mechanism and of the cassette across different rotations of the gearshift mechanism.

The drive arrangement may also be configured for stiffness in order to increase the precision and/or improve the relative alignment of components. For example, relevant components and elements of the rear gearshift mechanism, of the rear-wheel axle arrangement with the rear-wheel hub and the pinion cassette of the rear wheel, and the frame interfaces, associated therewith, of the rear-end structure of the bicycle frame, may be configured relative to one another such that, on the one hand, the gearshift mechanism is correctly positioned and installed on the frame relative to the pinion cassette, and relative to the chain running over the latter, in a reliable manner and with at most a non-detrimental degree of dependence on tolerances, and, at the same time, good stiffness is achieved, such that said correct positioning is maintained even during riding operation, despite possibly relatively high and fluctuating loads dependent on the underlying surface being ridden on.

Thus, a correspondingly intercoordinated configuration of the so-called B knuckle (or base element) of a rear gearshift mechanism, that is to say that sub-component of a rear gearshift mechanism which is installed at an associated frame interface, of the rear-end structure of the bicycle frame and specifically of the frame interfaces thereof at which the rear-wheel axle arrangement of the rear wheel and the rear gearshift mechanism is installed, and of the rear-wheel axle arrangement is possible, in order to satisfy requirements under the discussed aims of the correct positioning and alignment, precision and stiffness.

Against this technical background, the present invention relates generally to a rear gearshift mechanism of a bicycle derailleur system, and to the manner of installation of the rear gearshift mechanism in relation to a rear-wheel axle on a bicycle frame, and thus also to a bicycle frame which has a suitable frame interface for the rear gearshift mechanism.

SUMMARY

According to one embodiment, a rear gearshift mechanism for installation on a bicycle frame of a bicycle in a manner coaxial with respect to a rear-wheel axis has a base element, a pivot mechanism, a movable element and a chain guide arrangement. The pivot mechanism connects the base element to the movable element, and the chain guide arrangement is connected to the movable element to be rotatable about an axis of rotation (P). The base element includes a first attachment end for installation on the bicycle frame in a manner coaxial with respect to the rear-wheel axis (A), and a second attachment end for coupling to the pivot mechanism. The first attachment end has a first arm and a second arm which are arranged spaced apart from one another in an axial direction and which are configured for the installation of the rear gearshift mechanism on a bracket portion of a rear-end structure of the bicycle frame by an adapter, wherein the adapter has a thread for producing a screw connection, and in a defined pre-installed state and in a fully installed state, the first arm is situated on an axial inner side of the bracket portion and the second arm is situated on an axial outer side of the bracket portion. The base element is designed with a setting device which has an adjustment screw by which, in at least one of the pre-installed state and the fully installed state, the base element can be pivoted relative to at least one of the adapter and the bracket portion, coaxially with respect to the rear-wheel axis (A), in a chain tensioning

BRIEF DESCRIPTION OF DRAWINGS

FIG. 4 shows, in a partially sectional inside view, the base element, installed on the frame, of the rear gearshift mechanism according to the second exemplary embodiment;

FIG. 23a shows a perspective outside view of the base element, corresponding to FIG. 9a of EP '324;

FIG. 23b shows a perspective inside view of the base element, corresponding to FIG. 9b of EP '324.

Other aspects and advantages of the embodiments disclosed herein will become apparent upon consideration of the following detailed description, wherein similar or identical structures have similar reference numerals.

DETAILED DESCRIPTION

Figure 1:
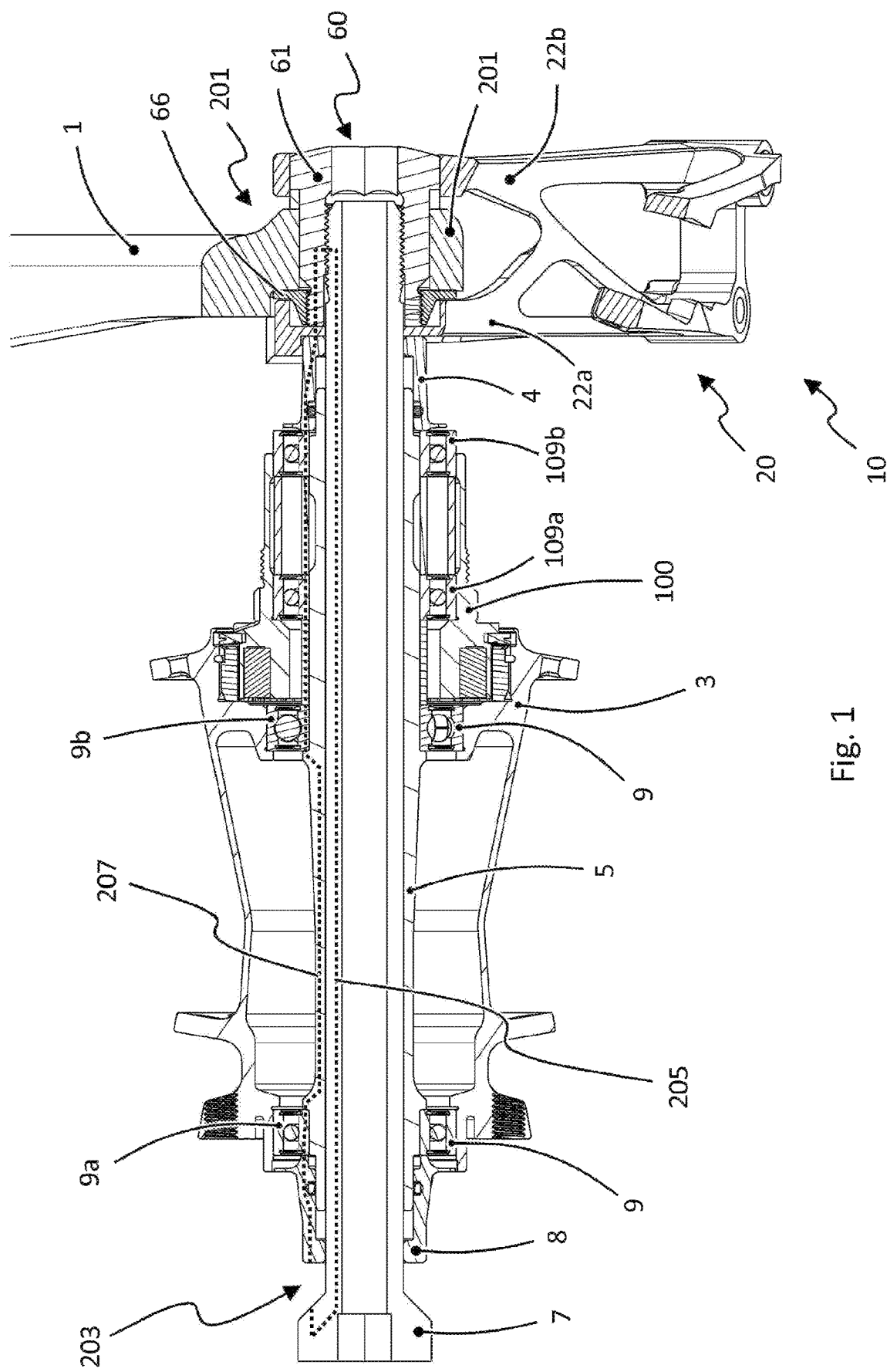
FIG. 1 shows a sectional view from the rear of a rear-axle arrangement which is installed on a bicycle frame and which has a coaxially connected base element of a rear gearshift mechanism.

Conventionally, rear gearshift mechanisms have been installed on the right-hand dropout of the frame with the aid of a derailleur hanger which is separate from the frame or which belongs to the frame, specifically in a manner offset with respect to the rear-wheel axle and thus non-coaxially in relation to the rear-wheel axle.

The derailleur hanger is, for this purpose, fixed at one end to the frame, coaxially with respect to the rear-wheel axle, and at its other end to the base element (B knuckle) of the gearshift mechanism. The base element is rotatable relative to the derailleur hanger about the B axle. Derailleur hangers differ greatly from one another depending on manufacturer and type of attachment. They may be formed as a single piece with the frame or may be present as a separate component. Separate derailleur hangers are clamped to the frame either by quick-release axles or by plug-in axles. Clamping is possible both on the frame outer side and on the frame inner side. This has the result that, depending on the derailleur hanger used, the gearshift mechanism assumes a different position relative to the rear-wheel axle and also relative to the pinion assembly. These differences in position in an axial and in a radial direction complicate the design of the gearshift mechanism and the installation thereof. The gearshift mechanism must be newly set in a manner dependent on the derailleur hanger. The additional component adds tolerances which have an adverse effect on the positioning accuracy of the gearshift mechanism.

Furthermore, derailleur hangers, specifically as separate components, are susceptible to damage and are often unstable. In the case of large pinion assemblies and correspondingly large gearshift mechanism dimensions, increased lever forces arise, which can be only unsatisfactorily accommodated by an exchangeable derailleur hanger. Furthermore, the enlarged gearshift mechanism dimensions with the lengthened lever ratios additionally have an adverse effect on the positioning accuracy of the gearshift mechanism. Conflicting with this is the fact that, specifically, an increased number of pinions arranged closely adjacent to one another demands increased positioning accuracy.

With regard to these and other disadvantages of such an installation of the rear gearshift mechanism on the frame, the present disclosure depicts a new type of rear gearshift mechanism for installation on a correspondingly designed bicycle frame in a manner coaxial with respect to the rear-wheel axle, to which pending patent applications are directed. The bicycle frame has a special interface for the rear gearshift mechanism, which simultaneously serves, with the cooperation of a frame adapter of the rear gearshift mechanism, as a frame interface for the rear-axle arrangement on one axial frame side. Furthermore, said frame interface including the base element (B knuckle) and the frame adapter, and the frame interface on the other axial frame side for the rear-axle arrangement, on the one hand, and the rear-axle arrangement, on the other hand, are suitably configured relative to one another. In this way, not only are the stated disadvantages overcome, but it is moreover possible to realize sufficient or even very good stiffness of the arrangement of the gearshift mechanism at its frame interface. The aims, discussed in the introduction, of correct positioning, alignment and precision can be reliably met.

In this regard, reference is made to the German patent application with the file reference 10 2018 001 253.1, published as DE 10 2018 001 253 A1, to the European patent application with the file reference 18 000 255.2, published as EP 3 388 324 A2, to the Taiwanese patent application with the file reference 107 107 712, published as TW 2018 34 921 A, to the Chinese patent application with the file reference 2018 1021 7966.9, published as CN 10 8622 302 A, and to the US application with the file reference Ser. No. 15/926, 194, published as US 2018/0265169 A1, which are attributable to SRAM Deutschland GmbH. The disclosure of these applications is, by reference, incorporated in its entirety into the disclosure of the present patent application.

Said documents disclose a rear gearshift mechanism for installation on a bicycle frame of a bicycle in a manner coaxial with respect to a rear-wheel axis. The known gearshift mechanism has a base element, a pivot mechanism, a movable element and a chain guide arrangement. The pivot mechanism connects the base element to the movable element, and the chain guide arrangement is connected, to be rotatable about an axis of rotation, to the movable element. The base element comprises a first attachment end for installation on the bicycle frame in a manner coaxial with respect to the rear-wheel axis, and a second attachment end for coupling to the pivot mechanism. The first attachment end has a first arm and a second arm which are arranged spaced apart from one another in an axial direction and which are configured for the installation of the gearshift mechanism on an associated bracket portion (in particular dropout or frame hanger) of a rear-end structure of the bicycle frame by an associated adapter. The adapter has at least one thread for producing a screw connection. In a defined pre-installed state and in a fully installed state, the first arm is situated on an axial inner side of the bracket portion and the second arm is situated on an axial outer side of the bracket portion.

Such a rear gearshift mechanism is also known from the publications DE 10 2018 206 104 A1, EP 3 556 643 A1, CN 11 0386 220 A and US 2019/0322333 A1, the disclosure of which is likewise, by reference, incorporated in its entirety into the disclosure of the present patent application.

Below, only the document EP 3 388 324 A2, also referred to for short as EP '324, will be expressly referred to, inter alia as a representative of the two patent families discussed. The following disclosure in its various aspects, and the exemplary embodiment rendering this in exemplary terms, makes use of the definitions, relationships and expressions used in document EP '324, and the content of said document is expressly a constituent part of the present description, not only with regard to the definitions and technical relationships used in EP' 324.

According to EP '324, as can be seen in detail from FIGS. 5 to 8 thereof, a frame adapter 60 is used for the installation of the gearshift mechanism 10. The frame adapter 60 is screwed to a right-hand dropout or frame hanger of the rear-end structure of a bicycle frame such that the knurled nut or adapter nut 66 belonging to the frame adapter 60, by positively locking or frictionally engaging abutment by its end-side knurling against the inner side of the right-hand frame hanger, is caused to assume a defined rotational angular position relative to the frame hanger.

By this defined rotational angular position of the adapter nut 66, it is possible, by abutment of the base element (so-called B knuckle) of the gearshift mechanism against rotational abutment projections 68a/b of the adapter nut 66 (see FIG. 8 of EP '324), to set and fix a corresponding rotational pivoting position of the gearshift mechanism 10 relative to the bicycle rear axle. In this way, the bicycle chain has the desired chain tension, or the chain tension required for optimum gearshift function, imparted to it by the torsion spring that is situated in the conventional manner between the element (so-called P knuckle 40, see FIG. 3 of EP '324) which is movable for gearshift purposes and the chain guide arrangement (so-called chain cage 50, see FIG. 3 of EP '324).

A progression of this setting process for producing the desired chain tension is described in detail in paragraphs [0089] to [0090] in EP '324, and may likewise take place analogously in the case of the coaxial gearshift mechanism connection according to the present disclosure.

Proceeding from EP '324, the present disclosure provides alternative solutions and refinements of the known solutions for the connection of a bicycle gearshift mechanism to the right-hand frame hanger or dropout of a bicycle frame rear-end structure in a manner coaxial with respect to the rear axle, which yield various advantages.

According to a first embodiment, for the rear gearshift mechanism defined in the introduction, it is proposed that the base element be formed with a setting device which has at least one manually actuatable adjustment screw. By the setting device, it is advantageously possible, in at least one of the pre-installed state and the fully installed state, for the base element to be able to be pivoted relative to at least one of the adapter and the bracket portion in a chain tensioning direction coaxially with respect to the rear-wheel axis. Alternatively, by the setting device, it is possible for a second sub-element of the base element, which is pivotably articulated on a first sub-element of the base element, to be able to be pivoted relative to the first sub-element, which has the first attachment end, in a chain tensioning direction. The purpose of this adjustment is, in the fully installed and/or the pre-installed state of the rear gearshift mechanism on the bicycle frame, to set a chain tension of a bicycle chain, which is guided by the chain guide arrangement and which runs over a pinion of a pinion assembly of a rear wheel of the bicycle, and/or to set a spacing of an upper chain guide roller of the chain guide arrangement to the pinion.

This may constitute an additional setting and adjustment facility, or an alternative setting and adjustment facility, in relation to the setting and adjustment facility known from EP '324. The setting of the chain tension or of the spacing of the upper chain guide roller to a particular reference pinion of the pinion assembly (so-called chain gap, wherein the reference pinion is not necessarily the smallest or the largest pinion of the pinion assembly) is of major importance in practice. The present disclosure permits fine setting or resetting, for example also in order to allow for chain wear and associated elongation of the bicycle chain. This setting or resetting or fine adjustment is facilitated in relation to the solution known from EP '324.

It is envisaged in particular that, in the case of a tensioned bicycle chain, a pivoting force acting in a chain tensioning direction can be exerted by the setting device on the base element, which pivoting force is opposite to an opposing pivoting force in a chain relaxing direction, which opposing pivoting force is exerted on the base element and is based on a tension of the bicycle chain.

With regard to the alternative solution with a multi-part base element which has the first sub-element and the second sub-element, it is envisaged that, in the case of a tensioned bicycle chain, a pivoting force acting in a chain tensioning direction can be exerted by the setting device on the second sub-element, which pivoting force is opposite to an opposing pivoting force in a chain relaxing direction, which opposing pivoting force is exerted on the second sub-element and is based on a tension of the bicycle chain.

If the setting device can directly subject the base element or the second sub-element only to pivoting forces acting in the chain tensioning direction, as will typically be the case for a setting screw subjected to pressure loading, the opposing pivoting force based on the tension of the bicycle chain can be utilized for pivoting the base element or the second sub-element in the chain relaxing direction, should this be desired in the case of the setting or resetting or fine adjustment of the chain tension or of the "chain gap".

With regard to the adapter which cooperates in the installation of the base element on the bicycle frame, it is envisaged that (analogously to EP '324) the adapter has an adapter bolt which can be inserted from an outer side of the bracket portion into a passage of the bracket portion and which has an external thread. The adapter may expediently furthermore comprise an adapter nut with an internal thread which, at the inner side of the bracket portion, can be screwed together with the external thread of the adapter bolt.

Alternatively, and in a departure from the proposals of EP '324, the adapter may however also be formed as a single piece.

Analogously to EP '324, the adapter, in particular the adapter bolt, may have an axial opening in which there is arranged an internal thread into which a counterpart thread of an associated plug-in axle can be screwed. Aside from a setting of the chain tension or of the "chain gap" that may still be required, the screwing-in and tightening of the plug-in axle will generally complete the installation of the rear gearshift mechanism on the bicycle frame, that is to say result in the discussed "fully installed state". A "defined pre-installed state" is to be regarded in particular as a state in which the plug-in axle (if provided) has not yet been screwed into the internal thread of the adapter bolt, or has already been screwed in but has not yet been tightened. In the case of an alternative implementation proposed below, in the case of which the single-piece adapter is to be screwed together with the first arm of the base element on the inner side of the bracket element, a state without tightening of the adapter in the corresponding internal thread of the first arm can be regarded as a "defined pre-installed state".

In general, the "defined pre-installed state" discussed here is a state of the rear gearshift mechanism in which the base element is pivotable relative to the bicycle frame with relatively low pivoting forces, in particular in the case of embodiments in which, as a result of tightening of a screw connection, frictional engagement or positive locking is produced which prevents such pivotability of the base element relative to the bicycle frame with relatively low pivoting forces, as is the case with the rear gearshift mechanism known from EP '324 in the "fully installed state".

As is known per se from EP '324, an inner diameter of a first centering opening, provided in the first arm, of the base element and a first outer diameter of the adapter, in particular of a bolt foot of the adapter bolt, may be coordinated with one another in order to center the gearshift mechanism in relation to the rear-wheel axis by the adapter. Consideration may alternatively also be given to coordinating an inner diameter of a first centering opening, provided in the first arm, of the base element and an associated outer diameter of the plug-in axle with one another in order to center the gearshift mechanism in relation to the rear-wheel axis by the plug-in axle. This possibility is likewise already known per se from EP '324.

Furthermore, analogously to the solutions of EP '324, in the fully installed state of the rear gearshift mechanism, the first arm may be clamped between an axial abutment surface of the adapter and an axial abutment surface of an abutment element, in particular of a hub end cap, of a rear-wheel axle arrangement of a rear wheel of the bicycle.

As an alternative to the stated solutions for centering, it is proposed that an inner diameter of a first centering opening, provided in the first arm, of the base element and an outer diameter of the abutment element already discussed, in particular hub end cap, of a rear-wheel axle arrangement of a rear wheel of the bicycle be coordinated with one another in order to center the gearshift mechanism in relation to the rear wheel axis by the abutment element. In this way good and reliable centering of the base element, and thus the intended coaxial installation in relation to the rear-wheel axis of the rear gearshift mechanism, can be achieved. In this context, consideration is given less to a clamping of the first arm between an axial abutment surface of the adapter and an axial abutment surface of the abutment element, although such an implementation may by all means be considered.

In a departure from the solutions of EP '324, it is furthermore proposed that, in the fully installed state of the rear gearshift mechanism, an axial abutment surface of the abutment element already discussed, in particular hub end cap, of the rear-wheel axle arrangement bears under load directly against an axial abutment surface of the adapter. In this case, the abutment element lends itself is a good solution as a reference for the centering of the first arm and thus of the base element, as proposed.

In the case of this support of the abutment element on the abutment surface of the adapter, a closed force flow via the rear-axle arrangement installed on the frame hangers is achieved in such a way as to bypass the first arm and preferably also the second arm of the base element, such that the discussed frictionally engaging rotational fixing of the base element in the fully installed state does not occur. In this case, the tightening of the plug-in axle or the like does not lead to firm clamping of the base element against the rear bracket portion of the bicycle frame, such that the setting device is required in order to provide a forward abutment for the base element and permit the setting of the chain tension or of the "chain gap".

According to one embodiment, which has already been briefly discussed, the adapter, which is preferably formed as a single piece as an adapter bolt, can, at an external thread, be screwed together with an internal thread of the first arm of the base element. This refinement proposal is aimed at reducing the number and complexity of the required individual parts of the rear gearshift mechanism, and thus at reducing the production and installation costs. In particular, in this refinement proposal, the adapter nut can be omitted.

According to a variant of the first embodiment, provision is made whereby the adapter and the first arm and the second arm of the base element are configured such that, as a result of tightening of the adapter, they axially clamp the bracket portion, which has axial abutment surfaces, of the bicycle frame between associated axial abutment surfaces of the first arm and of the second arm or between associated axial abutment surfaces of the first arm and of a bolt head of the adapter. As a result of tightening of the adapter, the base element is rotationally fixed on the bracket portion of the bicycle frame, ultimately in the manner in which this is achieved in the known solution of EP '324 as a result of the screwing-in and tightening of the plug-in axle. The setting of the chain tension or of the "chain gap" may accordingly be performed before said tightening of the adapter in the internal thread of the first arm if the base element is not designed with the sub-elements which are pivotable relative to one another.

In an alternative second variant, provision is made whereby a spacer sleeve is provided which is dimensioned to be received in a passage of the bracket portion of the bicycle frame. The adapter and the spacer sleeve and the first arm and the second arm of the base element are configured such that, as a result of tightening of the adapter, they axially clamp the spacer sleeve, which is received in the passage of the bracket portion of the bicycle frame, between associated axial abutment surfaces of the first arm and of the second arm or between associated axial abutment surfaces of the first arm and of a bolt head of the adapter.

In this case, the tightening of the adapter does not lead to firm clamping of the base element against the rear bracket portion of the bicycle frame, such that the setting device is required in order to provide a forward abutment for the base element and permit the setting of the chain tension or of the "chain gap".

In general, it is envisaged that an inner diameter of a second centering opening, provided in the second arm, of the base element and a second outer diameter of the adapter, in particular of a bolt head of the adapter, are coordinated with one another in order to center the gearshift mechanism in relation to the rear-wheel axis by the adapter bolt. In this respect, the rear gearshift mechanism corresponds to the known solution according to EP '324. Here, the second arm is preferably not rotationally fixed to the bracket portion of the bicycle frame as a result of the engagement of the adapter with the second arm of the base element.

As is known per se from EP '324, the adapter may, at least in certain regions, be rotationally neutral, in particular substantially rotationally symmetrical design, in such a way that no particular rotational orientation of the adapter relative to the bracket portion is provided, and no rotation of the adapter relative to the bracket portion is blocked or restricted.

As an alternative to this, it is proposed that the adapter is of rotationally asymmetrical design, in order to be able to engage in positively locking fashion, to provide rotational support, with an associated formation of the bicycle frame. In particular, the adapter may be formed with at least one abutment which can be placed in positively locking engagement with at least one associated counterpart abutment of the bicycle frame, in particular of the bracket portion, in order to secure the adapter, at least in the fully installed state, against rotation in at least one direction relative to the bicycle frame.

The solution according to EP '324, which is furthermore to be considered expedient and generally advantageous, may not always be the best solution, for example for cost reasons or for reasons relating to different surface characteristics of the adapter nut abutment surface on the frame hanger, depending on the frame design and frame material. The refinement proposal is also directed to cases of expected extreme loads, for which the proposed positive locking fixing of the adapter appears to be particularly expedient.

In a refinement, it is proposed that the abutment and the counterpart abutment are configured such that they secure the adapter against a rotation in a first direction of rotation relative to the bracket portion, which first direction of rotation corresponds to the chain relaxing direction which is opposite to the chain tensioning direction. In principle, positively locking rotation prevention in a second direction of rotation which is opposite to the first direction of rotation could also be provided. By contrast, it is however particularly expediently additionally proposed that the abutment and the counterpart abutment are configured such that they do not block a rotation of the adapter in the second direction of rotation relative to the bracket portion, which second direction of rotation is opposite to the first direction of rotation. Specifically, with regard to said second direction of rotation, the frictionally engaging fixing of the base element against rotation as is known per se from EP '324 is considerably more advantageous. The gearshift mechanism can then still be pivoted in the second direction of rotation in the event of a relatively intense action of force, such as could arise for example during riding for example as a result of a collision with an obstruction such as a branch, for example. Thus, the energy of such a gearshift mechanism collision can be absorbed and dampened in frictionally engaging fashion over a relatively long travel and thus on the basis of relatively low forces, in order to prevent damage to the gearshift mechanism.

According to an embodiment, an abutment surface of a radially protruding abutment projection of the adapter nut, already discussed as a possible sub-component of the adapter, forms the abutment, and a counterpart abutment surface of a surface contour of the bracket portion or of a formation, adjacent to said bracket portion, of the bicycle frame forms the counterpart abutment.

In all of the abovementioned design variants, an abutment surface, facing toward the bracket portion of the bicycle frame, of the adapter nut (if provided) of the adapter may be formed with a knurling for the purposes of intensifying the frictional engagement, as is known per se from EP '324.

Numerous possibilities exist with regard to the physical implementation of the setting device. Without restricting the general nature, it is preferable if the setting device has, on a first element, a threaded pedestal with which the adjustment screw is in screwed engagement. An abutment assigned to the adjustment screw is provided on a second element. The abutment and an end of the adjustment screw, which end is variably positionable by rotation of the adjustment screw in the threaded pedestal, are designed to form an adjustable rotational abutment for the base element. In the case of the discussed alternative solution, the abutment and the end of the adjustment screw, which end is variably positionable by rotation of the adjustment screw in the threaded pedestal, are designed to form an adjustable rotational abutment for the second sub-element, which has the second attachment end, of the base element in the direction of rotation which corresponds to the chain relaxing direction.

With regard to the expression "threaded pedestal", it is pointed out that an element which has a specific geometry or structure is not imperative for realizing the threaded pedestal. This expression is also intended to encompass a portion, equipped with a threaded opening, of one of the components in question, that is to be understood as being purely functional. It is however by all means possible for an element which has a specific geometry or structure to be identifiable as a threaded pedestal.

Expediently, in the pre-installed state and/or in the fully installed state, the adjustment screw is subjected to pressure loading based on the chain tension. By contrast, in the case of the base element being realized with the first sub-element and the second sub-element, a different adjustment device is preferable, which subjects the adjustment screw to tensile loading based on the chain tension.

In an implementation, the adapter forms one of the first element and the second element, and the base element forms the other of the first and the second element. Here, it is envisaged in particular, but not exclusively, that the adapter, in particular the adapter nut thereof, as first element, has the threaded pedestal, and the base element, as second element, has the abutment. The threaded pedestal may advantageously protrude radially from the adapter or from the adapter nut thereof.

This is a highly expedient embodiment, which is easy to implement, of the stated components in order to design the rear gearshift mechanism with the setting device.

In a refinement, it is proposed in this regard that the threaded pedestal extends into a cutout or a window of a portion, which extends in a circumferential direction around the adapter nut, of the first arm or of the second arm (preferably of the first arm) of the base element. A surface, which delimits the cutout or the window in the circumferential direction, of the first arm or of the second arm can then form the abutment for the adjustment screw.

In an alternative possible implementation, the bracket portion or a formation, adjacent to said bracket portion, of the bicycle frame forms one of the first element and the second element, and the base element forms the other of the first and the second element. In this regard, it is particularly expediently proposed that the base element, as first element, has the threaded pedestal, and the bracket portion or the formation, adjacent to said bracket portion, of the bicycle frame, as second element, has the abutment. It is thus possible to omit a threaded pedestal on the bicycle frame, which is advantageous with regard to the use of the bicycle frame with a rear gearshift mechanism which does not conform to the presented disclosure. In such a situation, an abutment which possibly performs no function is easier to accept than a threaded pedestal which performs no function. This solution for the implementation of the setting device is preferred for embodiments in which the adapter is screwed together with the first arm of the base element.

With regard to the implementation of the base element with the first sub-element and the second sub-element according to the discussed alternative solution, it is proposed that the setting device has a threaded pedestal on one of the first sub-element and second sub-element of the base element and has an abutment or a rotary bracket or a further threaded pedestal on the other sub-element of the base element. The adjustment screw is in threaded engagement with the threaded pedestal or—if provided—with the two threaded pedestals, which have oppositely oriented internal threads. In the case of the rotary bracket, the adjustment screw is held in said rotary bracket of the other sub-element to be rotatable and to be supportable at least with respect to tension in a longitudinal direction of the adjustment screw. If the abutment is provided on the other sub-element, the adjustment screw is supportable with respect to pressure on said abutment. Said elements are in each case arranged such that a pivot angle of the second sub-element relative to the first sub-element can be set by the adjustment screw.

In a first variant, in the pre-installed state and/or in the fully installed state, the adjustment screw is subjectable to pressure loading based on the chain tension. In a second variant, in the pre-installed state and/or in the fully installed state, the adjustment screw is subjectable to tensile loading based on the chain tension. For this purpose, the setting device may particularly expediently have a threaded pedestal on one sub-element and a rotary bracket on the other sub-element. The rotary bracket may be formed by a simple passage opening of a suitable element of the respective sub-element, through which passage opening the setting screw is inserted, wherein a screw head supports the acting tensile forces against said element which has the passage opening.

In general, it is proposed that a head of the adjustment screw is formed with a tool engagement formation. The head may be accessible from the rear in the installed state of the rear gearshift mechanism on the bicycle frame.

According to a second embodiment, which is independent of the first embodiment, the disclosure proposes, for a rear gearshift mechanism of the type mentioned in the introduction, that the adapter is formed with an abutment which can be placed in positively locking engagement with an associated counterpart abutment of the bicycle frame, in particular of the bracket portion, in order to secure the adapter, at least in the fully installed state, against rotation in at least one direction relative to the bicycle frame.

As stated above with regard to the corresponding refinement proposal for the rear gearshift mechanism according to the first embodiment, for some situations, such an adapter forms an advantageous alternative to the rotational fixing, known per se from EP '324, of the adapter nut and thus of the adapter as a whole.

In a refinement, it is proposed also for the rear gearshift mechanism according to the second embodiment that the abutment and the counterpart abutment are configured such that they secure the adapter against a rotation in a first direction of rotation relative to the bracket portion, which first direction of rotation corresponds to a chain relaxing direction. It is particularly expediently possible here for the abutment and the counterpart abutment to be configured such that they do not block a rotation of the adapter in a second direction of rotation relative to the bracket portion, which second direction of rotation is opposite to the first direction of rotation, in order to as far as possible prevent damage to the rear gearshift mechanism as a result of collisions, as discussed.

It is possible for an abutment surface of a radially protruding abutment projection of an adapter nut of the adapter to form the abutment, and for a counterpart abutment surface of a surface contour of the bracket portion or of a formation, adjacent to said bracket portion, of the bicycle frame to form the counterpart abutment.

In the context of the second embodiment, an abutment surface, facing toward the bracket portion of the bicycle frame, of the adapter nut may be formed with a knurling for the purposes of intensifying the frictional engagement.

Other possible implementations discussed in conjunction with the first embodiment may also be considered in the context of the further embodiment. Thus, the adapter may have an adapter bolt which is insertable into a passage of the bracket portion from an outer side of the bracket portion and which has an external thread. The adapter nut which is provided may have an internal thread which, at the inner side of the bracket portion, can be screwed together with the external thread of the adapter bolt. Said adapter nut may include the at least one abutment. Furthermore, the adapter, in particular the adapter bolt, may have an axial opening in which there is arranged an internal thread into which a counterpart thread of an associated plug-in axle can be screwed.

Various further possible refinements emerge from the invention and refinement proposals relating to the first embodiment.

According to a third embodiment of the disclosure, which is independent of the first embodiment and second embodiment, it is proposed, for a rear gearshift mechanism of the type mentioned in the introduction, that, in the fully installed state of the rear gearshift mechanism, an axial abutment surface of an abutment element, in particular of a hub end cap, of a rear-wheel axle arrangement of a rear wheel of the bicycle bears under stress directly against an axial abutment surface of the adapter.

A closed force flow is then produced in the rear-axle arrangement in such a way as to bypass the first arm of the base element, as discussed with regard to the corresponding refinement proposal relating to the first embodiment. Rotational fixing of the base element by clamping of the first arm thereof as a result of tightening of the plug-in axle or of an (alternatively provided) quick-release axle is then omitted, such that at least one forward rotational abutment for the base element must be realized in some other way. A manually actuatable setting device corresponding to the first embodiment preferably serves as a forward rotational abutment.

In order to nevertheless utilize the first arm for centering the base element, it is possible for an inner diameter of a first centering opening, provided in the first arm, of the base element and an outer diameter of an abutment element, in particular of the discussed hub end cap, of the rear-wheel axle arrangement of a rear wheel of the bicycle to be coordinated with one another in order to center the gearshift mechanism in relation to the rear wheel axis by the abutment element.

As stated with regard to the first and with regard to the second embodiments of the disclosure, the adapter may have an adapter bolt which is insertable into a passage of the bracket portion from an outer side of the bracket portion and which has an external thread. The adapter preferably comprises an adapter nut with an internal thread which, at the inner side of the bracket portion, can be screwed together with the external thread of the adapter bolt.

In conjunction with the third embodiment, it is envisaged in particular that the adapter, in particular the adapter bolt, has an axle opening in which there is arranged an internal thread into which a counterpart thread of an associated plug-in axle can be screwed.

Expediently, the adapter may, at is with the bracket portion of the bicycle frame, at least in certain regions, be of rotationally neutral, in particular substantially rotationally symmetrical, design, in such a way that no particular rotational orientation of the adapter relative to the bracket portion is provided, and no rotation of the adapter relative to the bracket portion is blocked or restricted.

Alternatively, with regard to some usage situations, provision may be made for the adapter to be of rotationally asymmetrical design, in order to be able to engage in positively locking fashion, to provide rotational support, with an associated formation of the bicycle frame. In particular, the adapter may be formed with an abutment which can be placed in positively locking engagement with an associated counterpart abutment of the bicycle frame, in particular of the bracket portion, in order to secure the adapter, at least in the fully installed state, against rotation in at least one direction relative to the bicycle frame.

It is envisaged in particular that the abutment and the counterpart abutment are configured such that they secure the adapter against a rotation in a first direction of rotation relative to the bracket portion, which first direction of rotation corresponds to a chain relaxing direction. It is particularly expediently possible here for the abutment and the counterpart abutment to be configured such that they do not block a rotation of the adapter in a second direction of rotation relative to the bracket portion, which second direction of rotation is opposite to the first direction of rotation, for the reasons discussed with regard to the first and second embodiments.

It is particularly expediently possible for an abutment surface of a radially protruding abutment projection of an adapter nut of the adapter to form the abutment, and for a counterpart abutment surface of a surface contour of the bracket portion or of a formation, adjacent to said bracket portion, of the bicycle frame to form the counterpart abutment.

In this context, provision may be made whereby an abutment surface, facing toward the bracket portion of the bicycle frame, of the adapter nut of the adapter is formed with a knurling for the purposes of intensifying the frictional engagement.

Further possible refinements emerge from the disclosure and refinement proposals relating to the first and to the second embodiments.

According to a fourth embodiment, which is independent of the first, second and third embodiments, the disclosure proposes, for a rear gearshift mechanism of the type mentioned in the introduction, that the adapter, which is formed preferably as a single piece as an adapter bolt, can, at an external thread, be screwed together (or is, at an external thread, screwed together) with an internal thread of the first arm of the base element.

Reference is made to the corresponding refinement proposal relating to the first embodiment.

According to a first implementation, the adapter and the first arm and the second arm of the base element are configured such that, as a result of tightening of the adapter, they axially clamp the bracket portion, which has axial abutment surfaces, of the bicycle frame between associated axial abutment surfaces of the first arm and of the second arm or between associated axial abutment surfaces of the first arm and of a bolt head of the adapter. It is thus possible to realize frictionally engaging rotational fixing of the base element to the bicycle frame, without a plug-in axle or quick-release axle exerting the corresponding clamping forces.

In an alternative second implementation, a spacer sleeve is provided which is dimensioned to be received in a passage of the bracket portion of the bicycle frame. The adapter and the spacer sleeve and the first arm and the second arm of the base element are configured such that, as a result of tightening of the adapter, they axially clamp the spacer sleeve, which is received in the passage of the bracket portion of the bicycle frame, between associated axial abutment surfaces of the first arm and of the second arm or between associated axial abutment surfaces of the first arm and of a bolt head of the adapter. As discussed with regard to the corresponding refinement proposal under the first embodiment, fixed clamping of the base element at its two arms to the bracket portion of the bicycle frame then does not occur, such that at least one forward rotational abutment for the base element is required. Said forward rotational abutment may be provided by a setting device according to the first embodiment.

Further possible refinements under the fourth embodiment will emerge from the disclosure and refinement proposals relating to the first, second and third embodiments.

According to a fifth embodiment, which is independent of the embodiments discussed above, said disclosure provides a rear gearshift mechanism for installation on a bicycle frame of a bicycle, which gearshift mechanism has a base element, a pivot mechanism, a movable element and a chain guide arrangement. The pivot mechanism connects the base element to the movable element, and the chain guide arrangement is connected, to be rotatable about an axis of rotation, to the movable element. The base element comprises a first attachment end for installation on the bicycle frame or on a bracket element installed thereon, in particular a so-called derailleur hanger or hanger, and a second attachment end for coupling to the pivot mechanism. Installation of the rear gearshift mechanism on the bicycle frame in a manner coaxial with respect to a rear-wheel axis is therefore not imperatively provided.

According to the embodiment, the rear gearshift mechanism is characterized by the fact that the base element has a first sub-element, which has the first attachment end, and a second sub-element, which has pivotably articulated on the first sub-element and which has the second attachment end. According to the embodiment, a manually actuatable setting device is furthermore provided, with which the second sub-element is adjustable relative to the first sub-element of the base element by at least one adjustment screw of the setting device, in order, in a fully installed state of the rear gearshift mechanism on the bicycle frame, to set a chain tension of a bicycle chain, which is guided by the chain guide arrangement and which runs over a pinion of a pinion assembly of a rear wheel of the bicycle, and/or to set a spacing of an upper chain guide roller of the chain guide arrangement to the pinion.

Independently of the coaxial installation of the rear gearshift mechanism at the rear-wheel axis the ability to set the chain tension or the "chain gap" in a manner which is easy and convenient for the technician or for the bicycle rider is also of interest, for which the invention proposal according to the fifth embodiment is a good basis.

In the case of a tensioned bicycle chain, a pivoting force acting in a chain tensioning direction can be exertable by the setting device on the second sub-element, which pivoting force is opposite to an opposing pivoting force in a chain relaxing direction, which opposing pivoting force is exerted on the second sub-element and is based on a tension of the bicycle chain, as discussed with regard to the first embodiment.

As already mentioned, numerous possibilities exist for the implementation of the setting device. For example, the setting device may have a threaded pedestal on one of the first sub-element and second sub-element of the base element, and may have an abutment or a rotary bracket or a further threaded pedestal on the other sub-element of the base element. The adjustment screw is in threaded engagement with the threaded pedestal or—if provided—with the two threaded pedestals, which have oppositely oriented internal threads. In the case of the rotary bracket, the adjustment screw is held in said rotary bracket of the other sub-element to be rotatable and to be supportable at least with respect to tension in a longitudinal direction of the adjustment screw. If the abutment is provided on the other sub-element, the adjustment screw is supportable with respect to pressure on said abutment. Said elements are in each case arranged such that a pivot angle of the second sub-element relative to the first sub-element can be set by the adjustment screw.

The setting device may particularly expediently have a threaded pedestal on one sub-element and a rotary bracket on the other sub-element. The rotary bracket may be formed by a simple passage opening of a suitable element of the respective sub-element, through which passage opening the setting screw, which is to be subjected to tensile loading, is inserted, wherein a screw head supports the acting tensile forces against said element which has the passage opening.

Further possible refinements under the fifth embodiment of the present disclosure will emerge from the disclosure and refinement proposals under the first, second, third and fourth embodiments.

For example, a head of the adjustment screw, which is formed with a tool engagement formation, may be accessible from the rear in the installed state of the rear gearshift mechanism on the bicycle frame, which is ergonomically advantageous.

The gearshift mechanism according to the fifth embodiment is preferably installable on the bicycle frame of a bicycle in a manner coaxial with respect to a rear-wheel axis. For this purpose, the first attachment end of the base element may have a first arm and a second arm, which are arranged spaced apart from one another in an axial direction and which serve for the installation of the gearshift mechanism, specifically for the installation on an associated bracket portion, in particular dropout or frame hanger, of a rear-end structure of the bicycle frame in a manner coaxial with respect to the rear-wheel axis. Preferably, in the case of this installation, an adapter is used which has at least one thread for producing at least one screw connection.

In the context of this coaxial installation of the rear gearshift mechanism, too, reference is made to the corresponding disclosure and refinement proposals under the embodiments discussed above.

In general, for the rear gearshift mechanisms according to all embodiments of the present disclosure, in conjunction with the disclosed coaxial installation, it is proposed as a refinement that the base element is formed on its first arm with a cutout through which, after removal of a plug-in axle or of a quick-release axle, an axially protruding portion of a rear-wheel axle arrangement of a rear wheel of the bicycle can be led in order to enable the rear wheel to be dismounted without pivoting the rear running gear relative to the bicycle frame. In the context of the above-discussed proposals of all embodiments, this greatly simplifies the installation and the uninstallation of the rear gearshift mechanism. This refinement proposal is particularly expedient for embodiments such as the gearshift mechanism according to the fourth embodiment, in the case of which the base element is fixedly clamped on the dropout or frame hanger (bracket portion) by the adapter.

This refinement proposal is also of interest for the solutions known from EP '324. Accordingly, a sixth embodiment which is independent of the preceding embodiments, for a rear gearshift mechanism of the type mentioned in the introduction, that the base element thereof is formed on its first arm with a cutout through which, after removal of a plug-in axle or of a quick-release axle, an axially protruding portion of a rear-wheel axle arrangement of a rear wheel of the bicycle can be led in order to enable the rear wheel to be dismounted without pivoting the rear running gear relative to the bicycle frame.

The disclosure furthermore also provides a base element (B knuckle) according to the various embodiments which is suitable for retrofitting rear gearshift mechanisms according to EP '324 to form rear gearshift mechanisms according to the present disclosure and which can also be used for the production and provision of gearshift mechanisms according to the above description and according to the appended claims. Such a base element according to the present disclosure is connectable to an associated movable element by a pivot mechanism and has a first attachment end for installation on a bicycle frame in a manner coaxial with respect to a rear-wheel axis and has a second attachment end for coupling to the pivot mechanism. The first attachment end has a first arm and a second arm which are arranged spaced apart from one another in an axial direction and which are configured for the installation of the base element, and thus of a gearshift mechanism which comprises the base element, on an associated bracket portion (in particular dropout or frame hanger) of a rear-end structure of the bicycle frame by an associated adapter. The adapter has at least one thread for producing at least one screw connection. In a defined pre-installed state and in a fully installed state, the first arm is situated on an axial inner side of the bracket portion and the second arm is situated on an axial outer side of the bracket portion. According to the disclosure, the base element and/or the adapter are designed according to one or more of the above-defined embodiments and refinement proposals, and are installable on the frame.

The disclosure furthermore provides a bicycle which includes a bicycle frame with a rear wheel and which includes a derailleur system which has a rear gearshift mechanism. The bicycle furthermore has the following features: the rear wheel is formed with a stator arrangement, which comprises a rear-wheel axle arrangement, and with a rotor arrangement. The rotor arrangement is mounted or mountable to be rotatable relative to the stator arrangement and comprises a rotor hub with a driver which bears a pinion assembly of the derailleur system. A rear-end structure of the bicycle frame has a left-hand bracket portion (in particular dropout or frame hanger) and a right-hand bracket portion (in particular dropout or frame hanger) for an inner axle of the rear-wheel axle arrangement of the rear wheel. The inner axle may be a plug-in axle or a quick-release axle.

The two bracket portions have a predetermined defined axial spacing along a geometrical axis of the inner axle installed on the frame by the bracket portions, and form in each case one counterbearing for a component group which is arranged on the inner axle and which is clamped between the bracket portions and which comprises an assembly of the stator arrangement. The rear gearshift mechanism is installed on the bicycle frame in a manner coaxial with respect to the geometrical axis and comprises a base element, a pivot mechanism, a movable element, and a chain guide arrangement. The pivot mechanism connects the base element to the movable element, and the chain guide arrangement is connected, to be rotatable about an axis of rotation, to the movable element. The base element comprises a first attachment end for installation on the bicycle frame in a manner coaxial with respect to the geometrical axis, and a second attachment end for coupling to the pivot mechanism.

The first attachment end of the base element has a first arm and a second arm which are arranged spaced apart from one another in an axial direction and which are configured for the installation of the gearshift mechanism on the associated right-hand bracket portion of the rear-end structure by an associated adapter. The adapter has at least one thread for producing a screw connection. The first arm is situated on an axial inner side of the associated bracket portion and the second arm is situated on an axial outer side of the associated bracket portion. The rear gearshift mechanism is designed according to one or more of the proposals of at least one or more of the above-discussed embodiments, and is installed on the bicycle frame.

The exemplary embodiments will be discussed in more detail below shown in FIGS. 2 to 13 and 24 and on the basis of FIG. 1 and FIGS. 14 to 23, which originate from the published application EP 3 388 324 A2, also referred to as EP '324.

The exemplary embodiments of the present disclosure under its various aspects, as illustrated in FIGS. 2 to 13 and 24, will be described below on the basis of the known solution according to document EP '324. Here, for analogous elements, the same reference designations as in FIGS. 14 to 23 and the further figures of EP '324 and the associated description below and in EP '324 will be used. Numerical reference designations newly introduced in relation to EP '324 have a numerical value greater than 200. The description of the embodiments will focus on the differences, in the sense of modifications and additions, in relation to the known solutions of document EP '324, in order to avoid repetition of that which is already known. With regard to the basic construction of the rear gearshift mechanism, and the installation thereof on the bicycle frame, and further details and design possibilities, reference is expressly made to FIGS. 14 to 23 and the associated description below and to the entire content of EP '324.

FIG. 1 firstly shows the coaxial connection of a rear bicycle gearshift mechanism 10 to a right-hand frame hanger 201, as is disclosed similarly in EP '324.

It can be seen in FIG. 1 that the first arm 22*a*, on the left in the drawing, of the base element (B knuckle) 20 is clamped between the right-hand hub end cap 4 and the adapter bolt 61 in frictionally engaging fashion by axial action of force and is thus (in addition to the abutment of the base element 20 against the rotational abutment projections 68*a*, 68*b* of the adapter nut 66, as already discussed above and described in more detail below) rotationally fixed as soon as the plug-in axle 7 is screwed tight in the adapter bolt 61 and thus an axial force flow in the rear axle is produced, as represented in the drawing by a dotted line. Said axial force flow is closed at 203 by the left-hand frame hanger (not illustrated). The portion 205 of the dotted line represents the tensile stress in the plug-in axle, and the portion 207 of the dotted line represents the compressive stress in the hub axle 5, on which the hub sleeve 3 is rotatably mounted. In addition to the right-hand hub end cap 4, the hub axle 5 and the hub sleeve 3, the hub arrangement also comprises the left-hand hub end cap 8 and the hub bearing arrangement 9 with hub bearings 9*a*, 9*b* designed as rolling bearings. The driver 100 is mounted rotatably on the hub axle 5, independently of the hub sleeve 3, by driver bearings 109*a*, 109*b*. The compressive-stress force flow 207 runs, without compressive loading of the rotatable components, through the hub axle 5 which receives the plug-in axle 7.

In this way, that is to say on the basis of the clamping of the first arm 22*a* of the base element 20 between the adapter bolt 61 and the hub end cap 4 as a result of the tightening of the plug-in axle 7, the base element (B knuckle) 20 and thus the bicycle gearshift mechanism 10 are rotationally fixed in relation to the rear-wheel axis in frictionally engaging fashion. The gearshift mechanism 10 can then be pivoted clockwise (clockwise in relation to the lateral view in FIGS. 14 and 15) about the rear-wheel axis only as a result of relatively intense action of force, such as may arise during riding for example in the event of a collision with an obstruction such as a branch, for example. Through this characteristic of the coaxial gearshift mechanism connection described in EP '324, it is thus possible for the energy of such a gearshift mechanism collision to be absorbed over a relatively long travel, and thus on the basis of relatively low forces, converted into heat by the frictionally engaging clamping of the base element 20 between the right-hand hub end cap 4 and the adapter bolt 61, and thus dissipated typically without damage to the gearshift mechanism 10. The right-hand, second arm 22b of the base element 20 is centered on the bolt head 62 of the adapter bolt 61 but is pivotable relative thereto without significant opposing forces.

Figure 19:
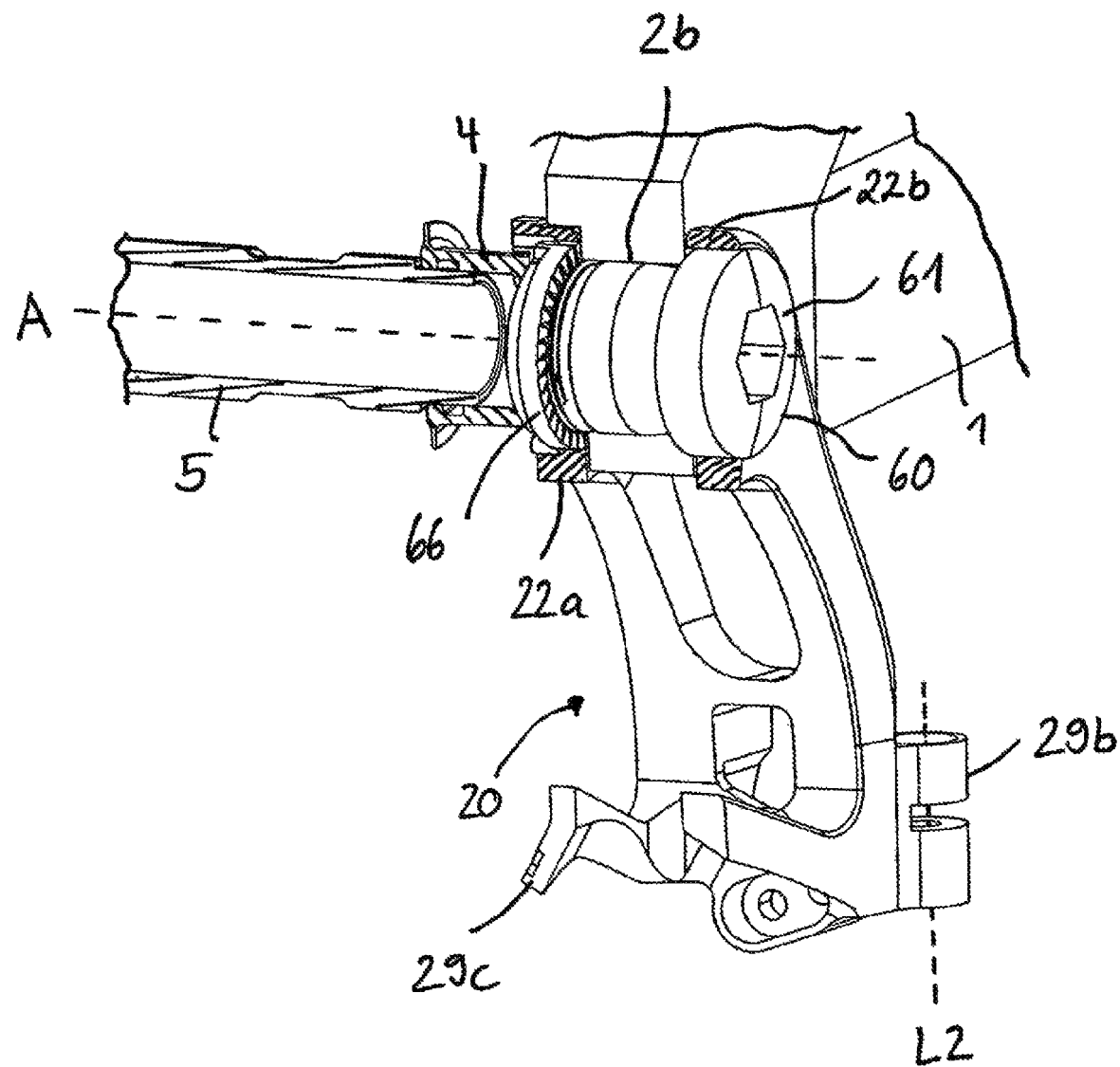
FIG. 19 shows a perspective partial section of the base element from FIG. 4 with adapter, corresponding to FIG. 5 of EP '324.
Figure 20:
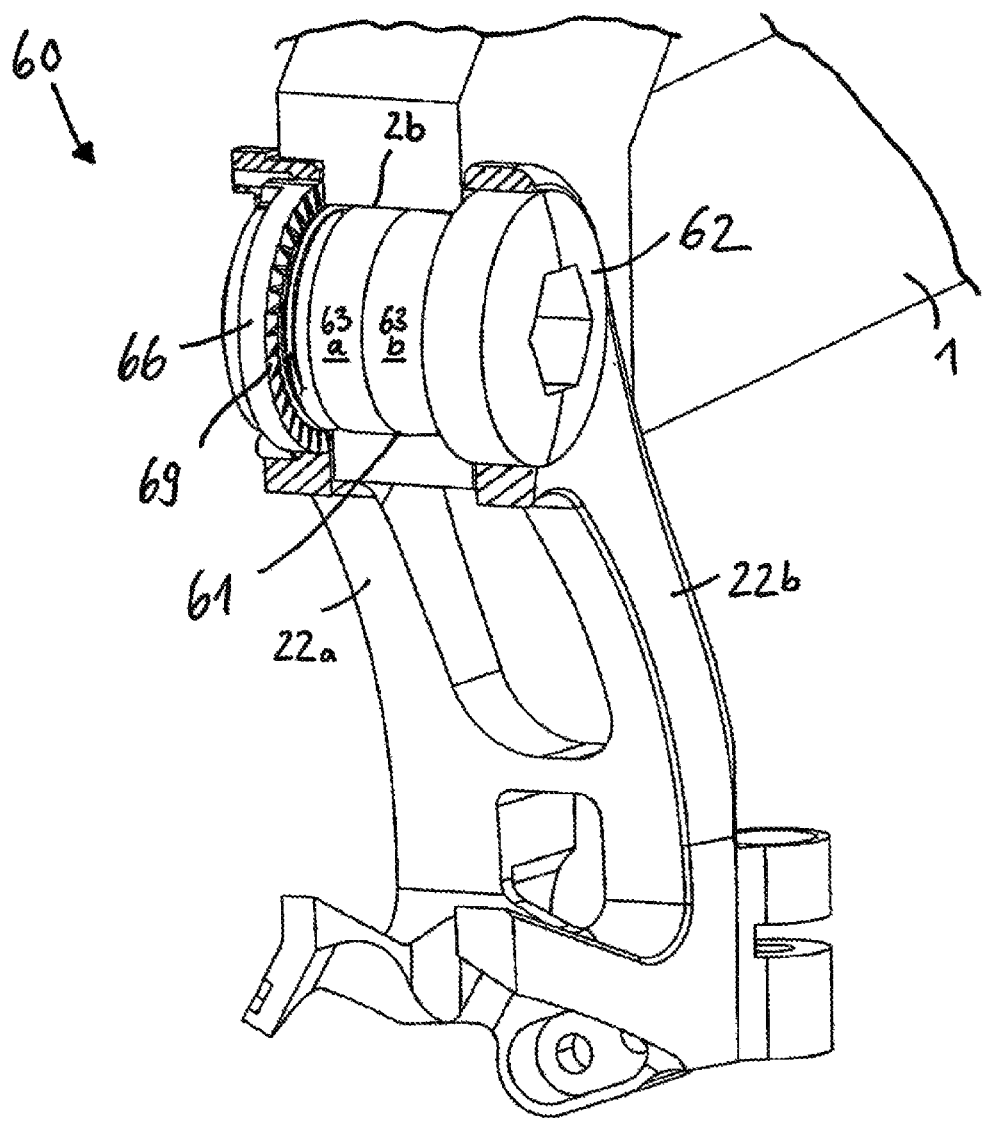
FIG. 20 shows an enlarged view of FIG. 19 without hub arrangement, corresponding to FIG. 6 of EP '324.

It is also pointed out that, as shown in the illustration in FIG. 1, the inner, first arm 22a is centered on the hub end cap 4 or on the plug-in axle 7, whereas, in the known embodiment of the above-discussed figures of EP '324, the inner, first arm 22a is centered on the adapter nut 66. Reference is made to FIGS. 19 and 20 and the associated description below. The centering on the hub end cap 4 or on the plug-in axle 7 or on the adapter nut 66 are technically equivalent possibilities for the centering of the first arm, which may be used selectively.

Figure 2:
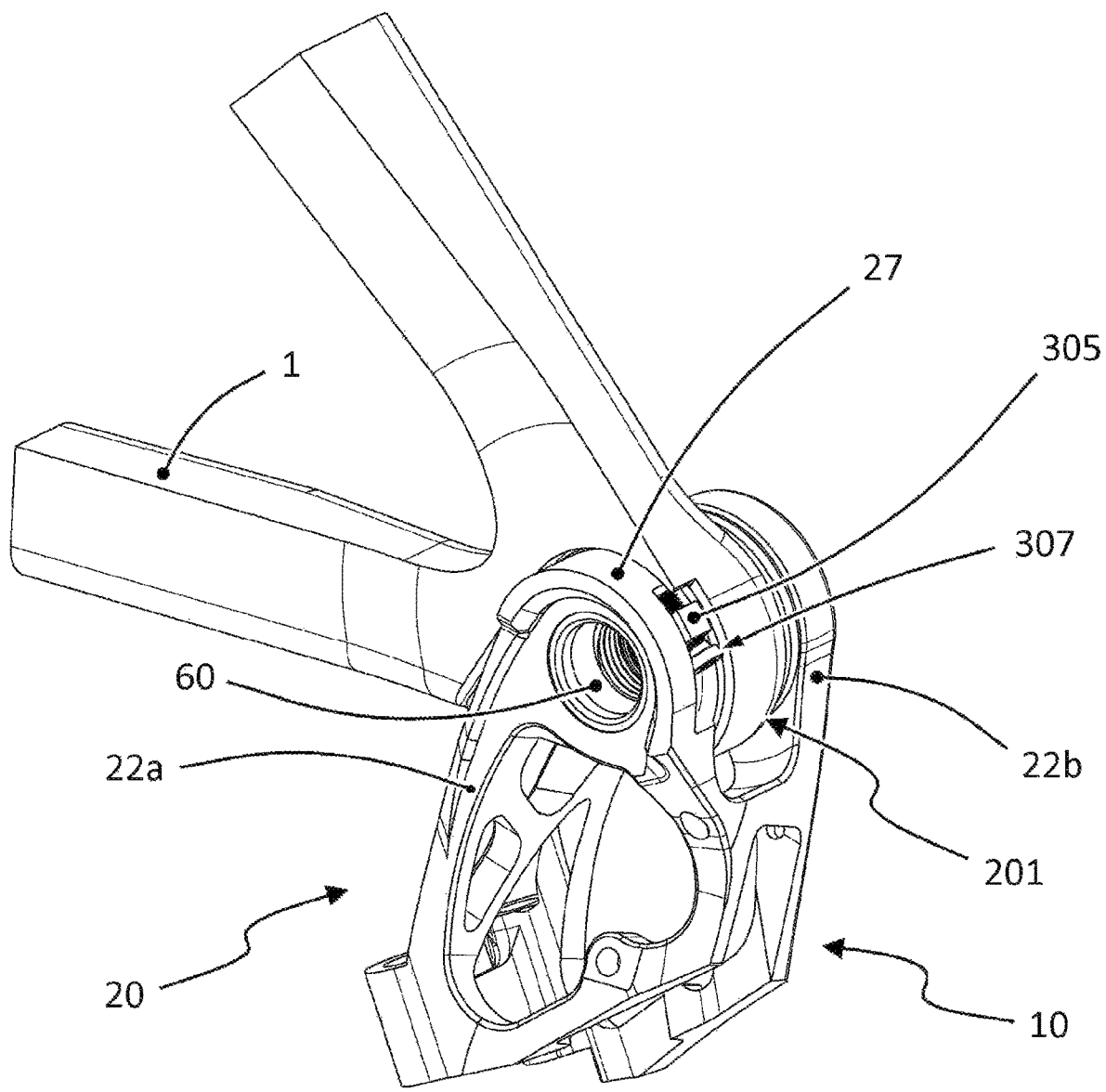
FIG. 2 shows a perspective inside view of the base element, installed on the bicycle frame, of a rear gearshift mechanism according to a first exemplary embodiment of the disclosure.

FIG. 2 shows a first embodiment of a coaxial gearshift mechanism connection to a bicycle rear-end structure. The base element (B knuckle) 20 shown in FIG. 2 duly differs from the solutions shown in the abovementioned EP '324 in certain details, for example with regard to the specific design of the two arms 22a and 22b of the base element 20. These differences are however not relevant for the first embodiment of FIG. 2. This means that the solution features of the present embodiment according to FIG. 2 may also be applied without limitation to the rear gearshift mechanisms presented in EP '324 or the base elements thereof (see for example FIG. 22) or to the coaxial gearshift mechanism connections disclosed in EP '324, which, with regard to the clamping of the base element 20 between the hub end cap 4 and the adapter bolt 61, substantially correspond to FIG. 1.

The major difference between the embodiment shown in FIG. 2 and the coaxial gearshift mechanism connection already known from EP '324 consists in that the adapter nut 66 in the embodiment of FIG. 2 has, instead of the rotational abutment projections 68a, 68b of FIG. 22, a threaded pedestal 305 into which an adjustment screw 307, hereinafter also referred to as "B screw", can be or is screwed. As can be seen from FIG. 2, an abutment of the base element, which abutment is arranged on the first arm 22a, on the left in the drawing, of the base element 20, abuts against that end of the adjustment screw 307 which faces toward the abutment.

Details of the setting device according to the present embodiment, which comprises the threaded pedestal 305, the adjustment screw 307 and the abutment of the base element 20, in the physical implementation according to FIG. 2 cannot be seen in their entirety in said figure. Reference is therefore made to the corresponding implementation in FIG. 3 (with the additional detail in FIGS. 3a, 3b and 3c) and 4, which have a corresponding threaded pedestal 405, a corresponding adjustment screw 407 and a corresponding abutment 409 on the first arm 22a of the base element 20. The adapter 60 in these figures of the second exemplary embodiment differs from the exemplary embodiment of FIG. 2 only by a rotationally asymmetrical design of the adapter nut 66 with an abutment projection 421, described in more detail below, for positive locking support against rotation on an associated abutment surface 422 of the frame 1.

As can be seen, the threaded pedestal 405 extends radially outwards into an opening or cutout 411 (see FIG. 4) in a portion, extending in a circumferential direction around the adapter nut 66, of the first arm 22a. A surface, which delimits said opening or cutout 411 in the circumferential direction, of the base element 20 forms the abutment 409 which interacts with the adjustment screw 407.

Figure 3:
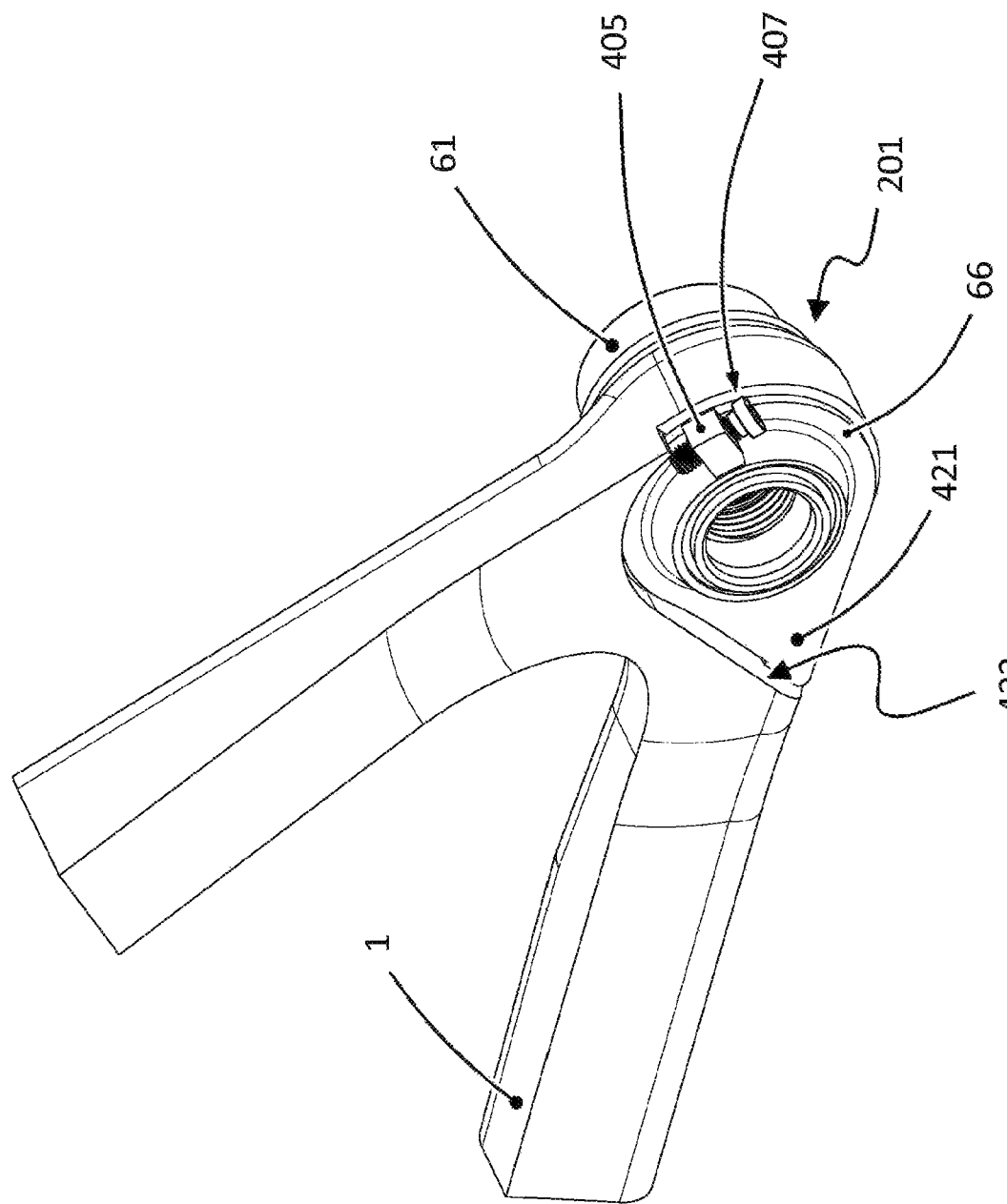
FIG. 3 shows a perspective view of a frame adapter installed on the bicycle frame according to a second exemplary embodiment.

This means that the abutment position between the adapter nut 66 and the base element (B knuckle) 20, which in the case of the known coaxial gearshift mechanism connection according to EP '324 is formed by interaction of the rotational abutment projections 68a/b of the adapter nut 66 with the counterpart abutments 24a/b arranged on the base element, and which in said document is invariable after the tightening of the frame adapter (see FIGS. 19 to 22), is of adjustable design in the embodiment of FIG. 2 and correspondingly in the embodiment of FIG. 3.

In other words, the rotational angular position of the base element 20 and thus of the gearshift mechanism, more specifically of the rotational front or forward abutment of the gearshift mechanism (counterclockwise in FIGS. 14 and 15), can be variably adjusted in the embodiment of FIG. 2, even when the adapter bolt 66 and the adapter nut 66 have already been rotationally fixedly connected to the frame hanger 201 by frictional engagement.

In this way, the chain tension or the spacing of the upper chain guide roller to a particular reference pinion of the pinion assembly (so-called "chain gap", see also FIGS. 11 and 12 of EP '324, wherein the reference pinion is not necessarily the smallest or the largest pinion of the pinion assembly) can be adapted or finely adjusted as required at any time by adjustment of the adjustment screw (B screw) 307 which, in FIG. 2, is arranged in the threaded pedestal 305 of the adapter nut 66, without the rotational fixing of the adapter bolt 61 in the frame hanger 201, and thus the rotational fixing of the adapter nut 66, having to be released for this purpose. It is merely necessary for the screwed engagement of the plug-in axle 7 into the internal thread 65 (see FIG. 21) to be released or sufficiently loosened in order to release or sufficiently loosen the clamping of the first arm 22a between the hub end cap 4 and the adapter bolt 61. Following this, by the setting device formed by the threaded pedestal 305, the setting screw 307 and the abutment of the base element 20, corresponding to the abutment 409, it is possible for the base element 20 to be pivoted easily, specifically by corresponding actuation of the setting screw, in the chain tensioning pivoting direction (clockwise in FIGS. 14 and 15) or—with cooperation of the chain tension—in the chain relaxing pivoting direction (counterclockwise in FIGS. 14 and 15).

Figure 3A:
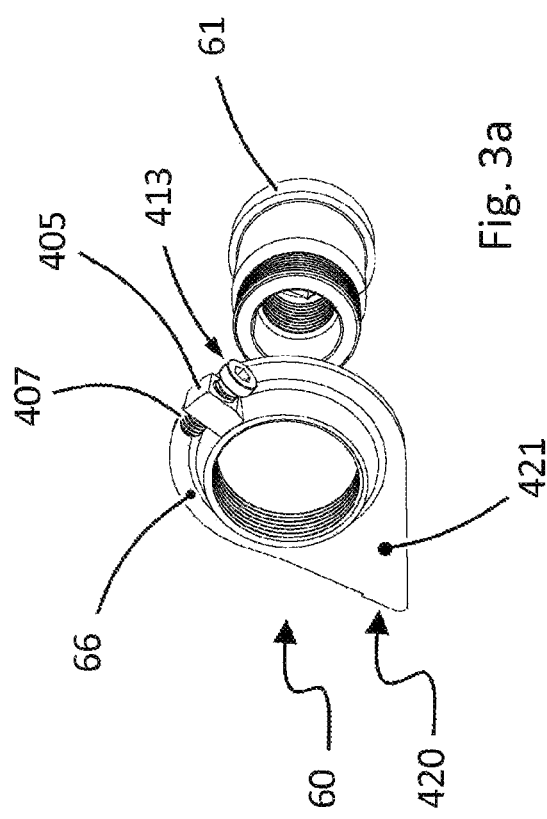
FIG. 3a shows a perspective view of the frame adapter according to the second exemplary embodiment.

In order to tension the chain, the setting screw 307 must be screwed into the threaded pedestal 305 in the direction of the abutment 409 of the base element 20 by a tool (for example, an Allen key or the like) which must be inserted from the rear into an engagement opening of a screw head (see screw head 413 in FIG. 3a). In order to relax the chain, the setting screw 307 must be screwed out of the threaded pedestal 305 by the tool.

In this way, it is thus possible for the drivetrain which comprises the chain and the gearshift mechanism to be adapted, in particular with regard to "chain gap" and chain tension, for example also to bicycle frames with suspension with a specific rear-end structure kinematic arrangement, in the case of which a relatively large so-called "chainstay growth" is encountered, that is to say the spacing between pedal crank shaft and rear axle varies significantly during suspension deflection movements of the rear-end structure. Other factors, too, such as a suspension deflection position that is for example taken into consideration in the setting of the drivetrain (so-called sag position, sinking depth or negative suspension travel of the suspension arrangement, caused by the static rider weight), or the chain wear that occurs over time and the associated elongation of the chain, can be easily readjusted or compensated for at any time by the embodiment illustrated in FIG. 2 with the adjustment screw (B screw) 407.

A further embodiment of a coaxial gearshift mechanism connection is illustrated in FIGS. 3 and 4. In the description of this exemplary embodiment, the same reference designations as in the preceding description of the first exemplary embodiment are used for analogous or identical elements, wherein, however, the numerical values of reference designations of provided by the present disclosure (reference designations with numerical values greater than 300) are increased by 100. It is analogously also the case in the following description parts relating to further exemplary embodiments that corresponding reference designations are in each case increased by 100, and, here, reference designations from EP '324 are also used further, in part with an added apostrophe or added apostrophes in order to denote the respective embodiment.

The embodiment of FIGS. 3 and 4, like the first embodiment of FIG. 2, has the manually actuatable setting device comprising the threaded pedestal 405, the adjustment screw 407 and the abutment 409 on the base element 20, which setting device serves for the setting or fine adjustment or readjustment of the chain tension or of the "chain gap". In the embodiment of FIGS. 3 and 4, too, the adjustment screw (B screw) 407 is (as in the embodiment of FIG. 2) again received in the threaded pedestal 405, which is preferably formed as a single piece with the adapter nut 66. As already described in the embodiment of FIG. 2 and illustrated therein, it is also the case here that the base element 20 again comes to bear against that end of the adjustment screw 407 which is situated opposite the screw head 413 (see FIG. 4), whereby the rotational pivoting position of the base element 20 and thus of the gearshift mechanism 10 relative to the adapter nut 66 and thus relative to the frame hanger 201 can be varied in continuous fashion at any time. As already described above with regard to the embodiment of FIG. 2, this serves in particular for the setting of the correct chain gap at the gearshift mechanism, and, as required, likewise for the possible later fine adjustment of the "chain gap" and chain tension.

Nothing needs to be added to the above statements made in the context of FIG. 2. It should however also be mentioned that a functionally substantially identical and structurally very similar adjustment device could also be realized by a threaded pedestal with an adjustment screw on the bolt head 62 of the adapter bolt 61 and a corresponding abutment of the second arm 22b of the base element, in a departure from FIG. 2 and from FIGS. 3 and 4. The arrangement of the setting device on the inside of the frame hanger 201, as implemented in these figures, is however preferred.

In the case of the coaxial gearshift mechanism connection known from EP '324, as already described above, the rotational fixing of the adapter nut 66 relative to the frame hanger 201 is realized by an end-side knurling of the adapter nut 66, see for example FIGS. 19 and 20. The first embodiment of FIG. 2 may also be realized in the same way.

This type of rotational fixing of the adapter nut 66 relative to the frame hanger 201 is however a solution which is not preferred in all cases, for example for cost reasons or for reasons relating to different surface characteristics of the adapter nut abutment surface on the frame hanger in the case of different frame designs or frame materials, or also in the case of possible extreme loading.

For this reason, in the embodiment of FIGS. 3 and 4, provision is made whereby the adapter 66 is fixable in positively nut locking fashion to the frame in a predefined rotational position. This may advantageously be realized by at least one rotational abutment on the adapter and at least one rotational abutment on the frame, which act in particular as forward abutments.

Figure 14:
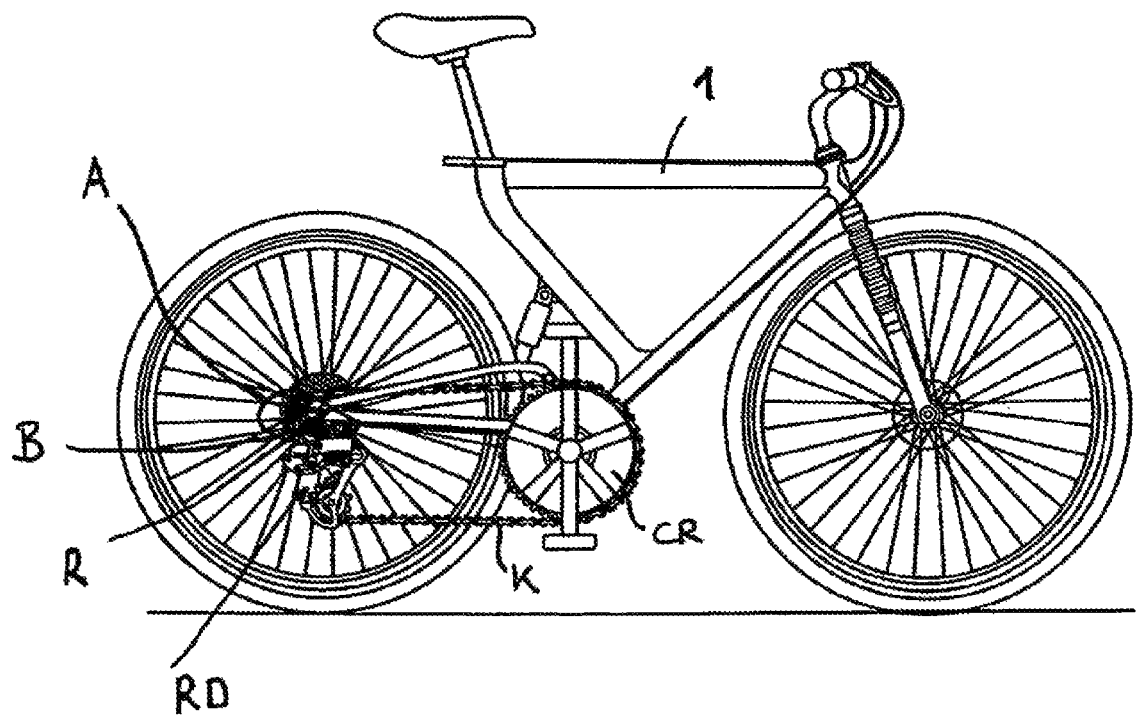
FIG. 14 shows a bicycle with a conventional gearshift mechanism according to FIG. 13 of EP' 324.

In the specific exemplary embodiment of FIGS. 3 and 4, the adapter nut 66, in addition or alternatively to its knurling such as is provided in the embodiment of FIGS. 1 and 2 and of EP '324, is formed with an abutment projection 421 which can be brought to bear in positively locking fashion by way of an abutment surface 420, which serves as abutment, against a corresponding counterpart abutment surface 422 (see FIG. 3c) which serves as a counterpart abutment and which is situated on the rear-end structure or frame hanger 201. The rotational fixing of the adapter nut 66 to the frame 1 is realized by this abutment of said elements against one another. Owing to this abutment, the adapter nut 66 cannot rotate relative to the frame in the direction of rotation represented in FIG. 4 by the arrow P1, whereby, as a result of the abutment of the adjustment screw (B screw) 407 against the abutment 409 of the first arm 22a of the base element 20, the base element cannot pivot in said pivoting direction P1, which corresponds to a chain relaxing direction. In the illustration of FIG. 14 below, said pivoting direction corresponds to a pivoting of the base element (P knuckle) counterclockwise relative to the bicycle frame 1.

Figure 3B:
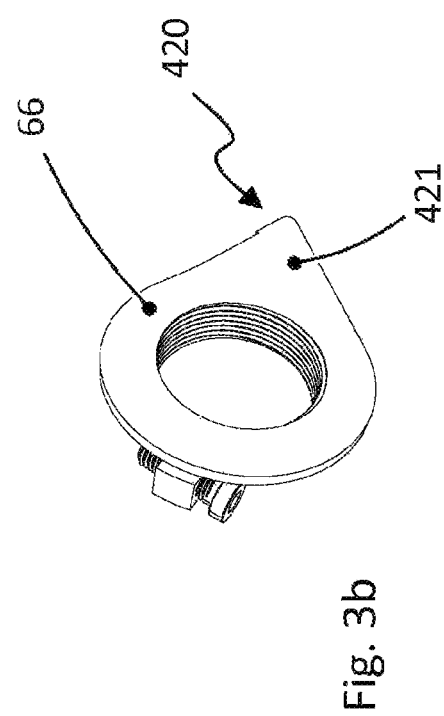
FIG. 3b shows a perspective view of the frame adapter according to the second embodiment.
Figure 3C:
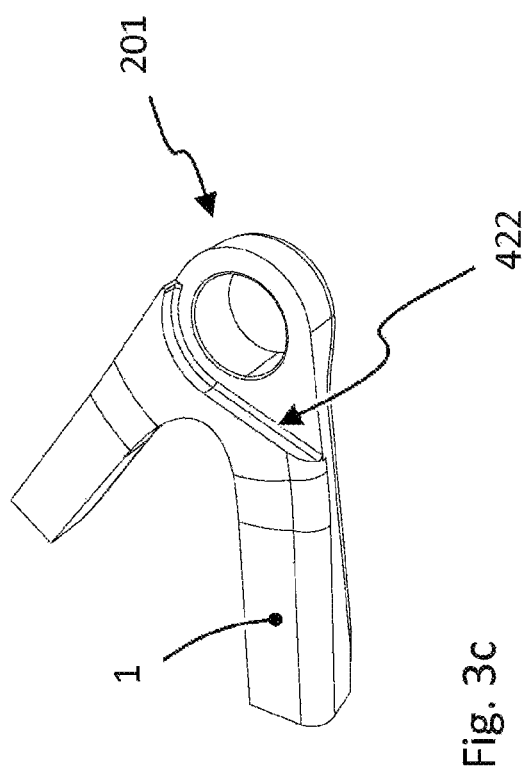
FIG. 3c shows a perspective view of the frame hanger according to the second exemplary embodiment.

For better clarity, the adapter nut 66 according to this embodiment is illustrated once again separately in FIGS. 3a and 3b. For the same reason, FIG. 3c once again shows the right-hand frame hanger 201 of FIG. 3 without the frame adapter 60, composed of the adapter bolt 61 and the adapter nut 66, inserted therein. Correspondingly, the abutment surface 422, arranged on the frame hanger 201, for the abutment projection 421 of the adapter nut 66 can also be clearly seen in FIG. 3c.

Figure 13:
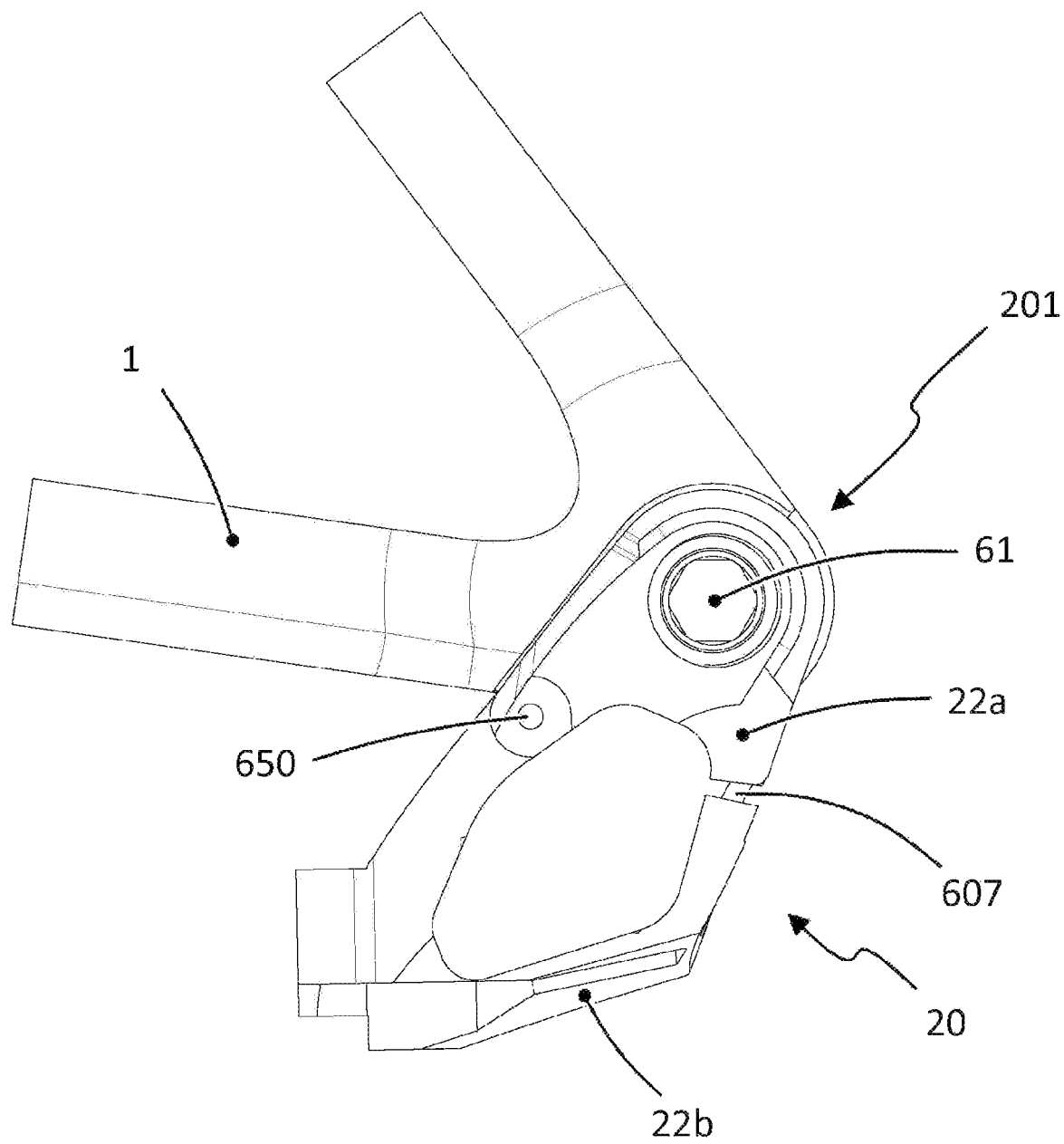
FIG. 13 shows the base element, installed on the frame, of the fifth exemplary embodiment in an inside view.

In the embodiment of FIGS. 3 and 4, it is thus the case that, after the installation of the frame adapter 60, the adapter nut 66 is rotationally invariably fixed by positive locking relative to the frame hanger 201 as regards the counterclockwise direction of rotation (as in FIGS. 13 and 1). This is the rotational direction or pivoting direction of the base element 20 relative to the frame hanger 201 which would give rise to a relaxing of the chain, guided by the chain guide arrangement 50, of the derailleur system.

Thus, in the embodiment of FIGS. 3 and 4, a setting of the rotational position of the base element 20 and thus of the gearshift mechanism 10 relative to the frame hanger 201 or relative to the bicycle rear-end structure (the setting of the chain gap and of the chain tension as discussed further above) can no longer be realized, according to EP '324, by virtue of the adapter nut 66 being rotated into the desired rotational position and being tightened in this position by the adapter bolt 61 and fixed against rotation on the frame hanger 201 in frictionally engaging fashion or by the discussed knurling of the adapter nut 66.

For this reason, the embodiment of FIGS. 3 and 4 has the facility for setting the at least one setting device which has a setting screw, which setting device may, without restricting the general nature, be designed as in FIG. 2 with a setting screw 407, the threaded pedestal 405 and the abutment 409 on the base element 20.

By contrast to this, in the embodiment of FIG. 2, the setting of the rotational position of the base element 20 and thus of the gearshift mechanism 10 relative to the frame hanger 201 may be realized selectively on the basis of the adjustment screw (B screw) 307 or by release or loosening of the clamping of the first arm 22a of the base element 20, release of the frame adapter 60, corresponding rotation of the adapter nut 66, subsequent retightening of the frame adapter 60 and re-clamping of the first arm 22a by tightening of the plug-in axle 7.

By contrast, a rotation of the adapter nut 66 from the position shown in FIG. 4 in a direction of rotation which is opposite to the chain relaxing direction (arrow P1), and which is represented in FIG. 4 by the arrow Q, is not blocked in positively locking fashion by the described embodiment of the adapter nut 66 with the abutment projection 421. Such a rotation is opposed only by frictionally engaging opposing forces or opposing forces based on the possible discussed knurling of the adapter nut 66. It is thus also possible in principle for the base element 20 to pivot relative to the frame 1 in said pivoting direction Q, which corresponds to a chain tensioning direction, if corresponding pivoting forces which overcome such opposing forces occur, for example owing to a collision of the gearshift mechanism against a branch or the like during riding operation. In the illustration of FIG. 14 below, said pivoting direction corresponds to a pivoting of the base element (P knuckle) clockwise relative to the bicycle frame 1.

Figure 5:
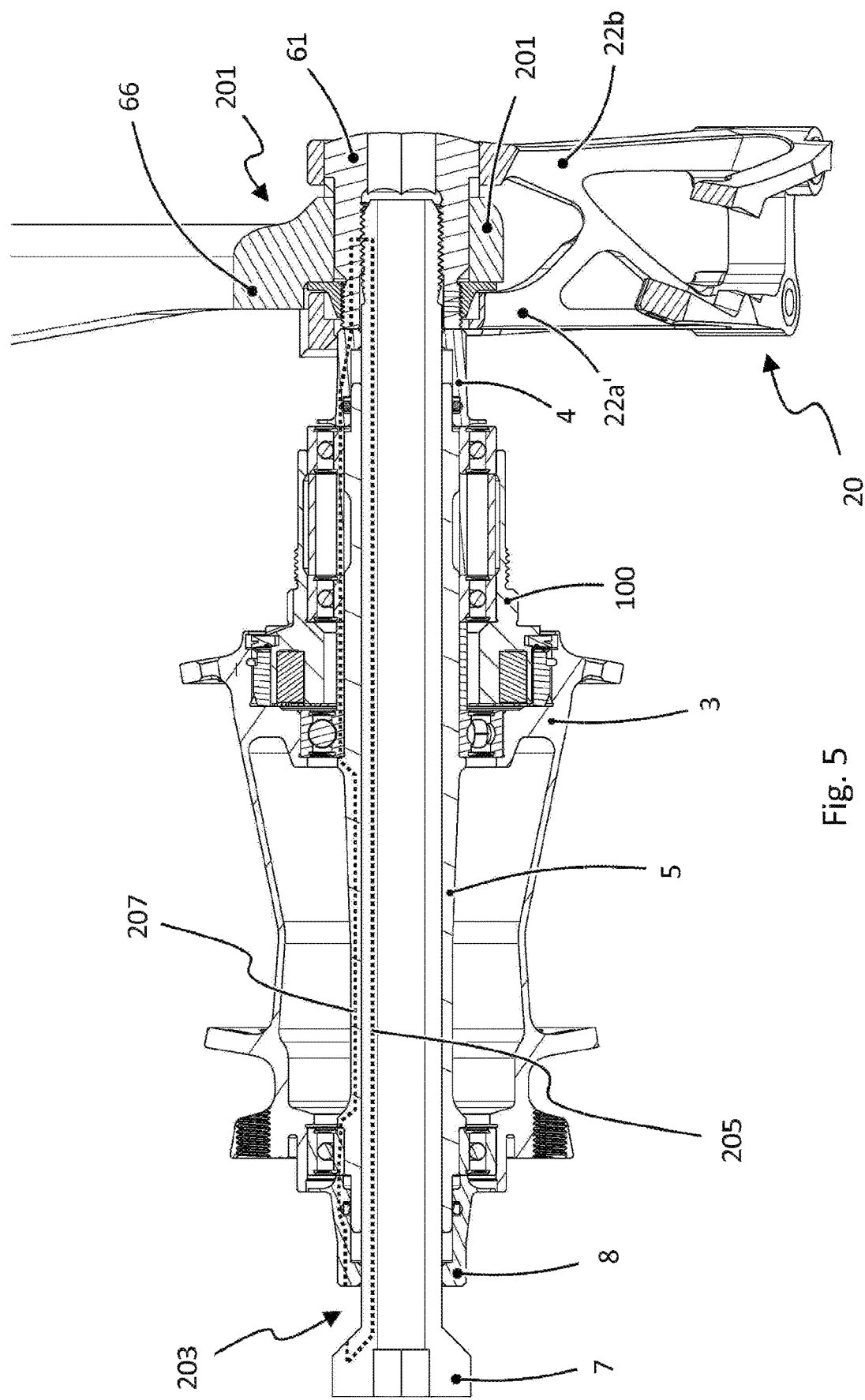
FIG. 5 shows, in an illustration corresponding to FIG. 1, a partially sectional view from the rear of the rear-axle arrangement, installed on the frame, with the coaxially installed base element of a rear gearshift mechanism according to a third exemplary embodiment.

FIG. 5 shows a further embodiment for a coaxial gearshift mechanism connection according to one aspect of the disclosure. FIG. 5 corresponds entirely to FIG. 1 with the exception that, in the embodiment of FIG. 5, the right-hand hub end cap 4 comes to bear directly against the left-hand end surface, in relation to the drawing, of the adapter bolt 61, and thus closes the axial force flow of the axle without incorporating the base element (B knuckle) 20 or the first arm 22a' thereof. The adapter bolt 61 thus directly forms the axial abutment for the hub end cap 4.

As described above with regard to FIG. 1, it is by contrast the case in the coaxial gearshift mechanism connection of FIG. 1, which in this regard corresponds to EP '324, that the first arm 22a, on the left in the drawing, of the base element 20 is clamped in frictionally engaging fashion, and thus rotationally fixed, between the right-hand hub end cap 4 and the adapter bolt 61 by axial action of force as soon as the plug-in axle 7 is screwed tight in the adapter bolt 61 and thus the axial force flow via the hub axle (rear axle) 5, and altogether a closed force flow, is produced.

By contrast to this, in the embodiment of FIG. 5, the base element 20 with its inner first arm 22a' centered on the hub end cap 4, and thus the gearshift mechanism 10, can be initially freely rotationally pivoted about the rear-wheel axis even when the plug-in axle 7 has been inserted and screwed tight in the adapter bolt 61.

Figure 15:
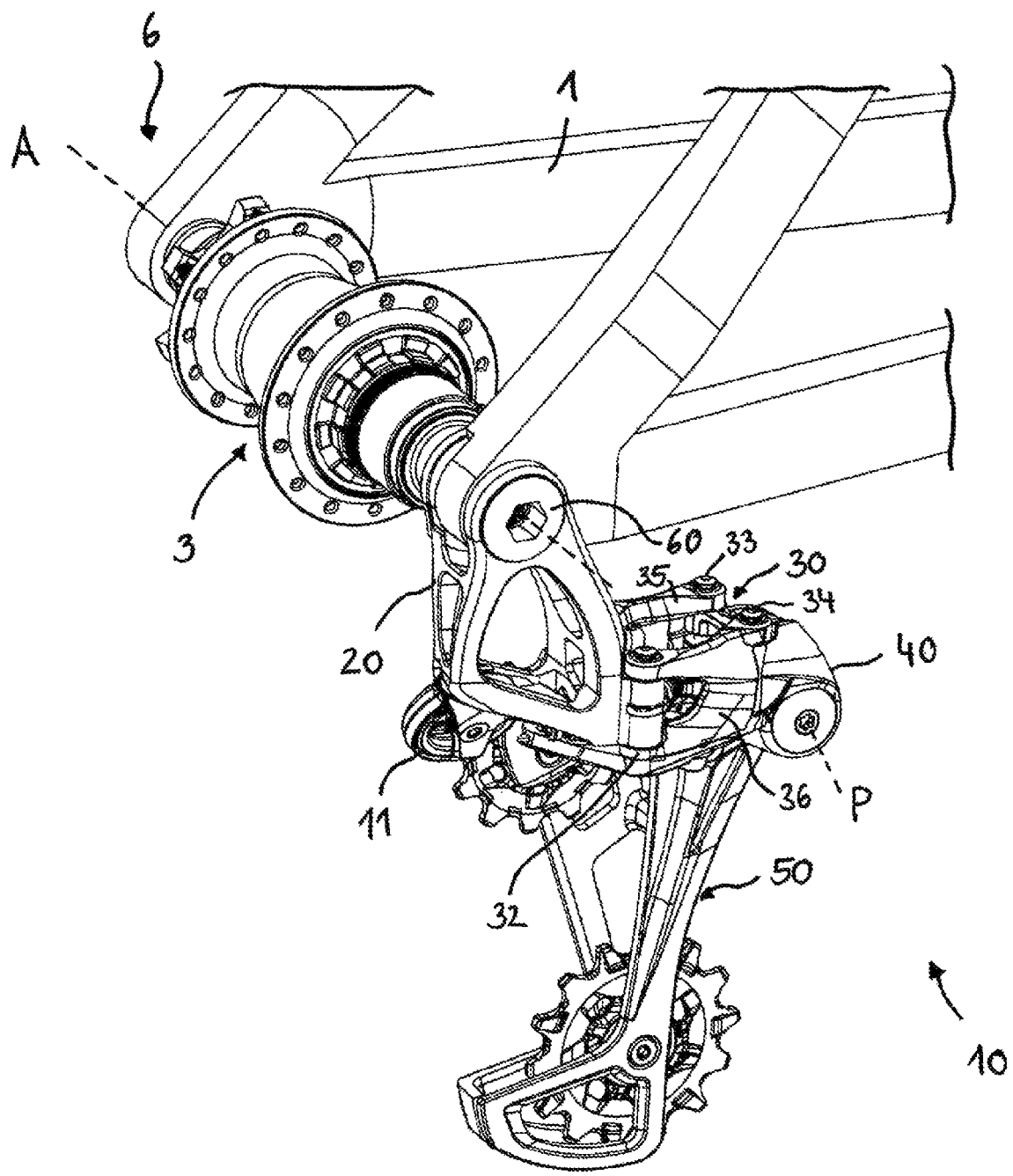
FIG. 15 shows a perspective outside view of a gearshift mechanism for installation coaxially with respect to the rear-wheel axis, corresponding to FIG. 1 of EP '324, which serves as a starting point for the description of the exemplary embodiments of the present disclosure.

This means that, in the embodiment of FIG. 5, the B knuckle and thus the gearshift mechanism must be rotationally fixed in some other way, at least as regards the counterclockwise pivoting direction in FIGS. 14 and 15.

For this purpose, in the embodiment of FIG. 5, a preferably adjustable rotational abutment of the base element (B knuckle) 20 is provided on an element which is fixed with respect to the frame or which is fixable to the frame, in particular the adapter nut 66, preferably in a similar or corresponding manner to that in the embodiments of FIGS. 2 to 4, as already described above. It is thus possible to provide the setting device, which also permits the setting, fine adjustment or readjustment of the chain tension and of the "chain gap" in a simple manner.

It is therefore envisaged, without restriction of the general nature, that the embodiment of FIG. 5 may exist in particular in two variants A) and B). In variant A), with an adjustment abutment by the setting screw (B screw) 307 similarly to FIG. 2, wherein the adapter nut 66 is rotationally fixed in frictionally engaging fashion, for example by a knurling, on the frame hanger 201 (as is also the case in EP '324). On the other hand, in variant B), with an adjustment abutment by the setting screw (B screw) 407 similarly to FIGS. 3 and 4, wherein the adapter nut 66 is in this case rotationally fixed in positively locking fashion by its abutment projection 421 on the frame hanger 201.

Both variants A) and B) of the embodiment of FIG. 5 have in particular the advantage that the above-described setting of the correct chain gap at the gearshift mechanism is possible here at any time, even when the plug-in axle has been firmly tightened, by corresponding adjustment of the setting screw (B screw) 307 or 407 respectively. The engagement of the plug-in axle 7 into the adapter bolt 61 does not need to be released or loosened.

In both variants A) and B) of the embodiment of FIG. 5, it is however the case that the base element (B knuckle) 20, and thus the gearshift mechanism 10, can in principle be freely pivoted rearwardly about the rear-wheel axis (clockwise in FIGS. 13 and 1) even during riding operation, which could thus under some circumstances lead to the gearshift mechanism swinging upwards, in particular during intense off-road operation.

This in turn cannot arise in the two embodiments of FIG. 2 and of FIGS. 3 and 4, as described further above, because the first, left-hand arm 22a of the base element 20 in these two embodiments is clamped axially between the right-hand hub end cap 4 and the frame adapter 60 as soon as the plug-in axle 7 has been screwed tightly into the bolt 61 of the frame adapter 60 (see FIG. 1). As described, however, it is necessary in those cases, for the purposes of rotationally adjusting the gearshift mechanism, for example in order to be able to set or adjust the chain gap, to initially loosen the clamping by the plug-in axle 7.

Figure 6:
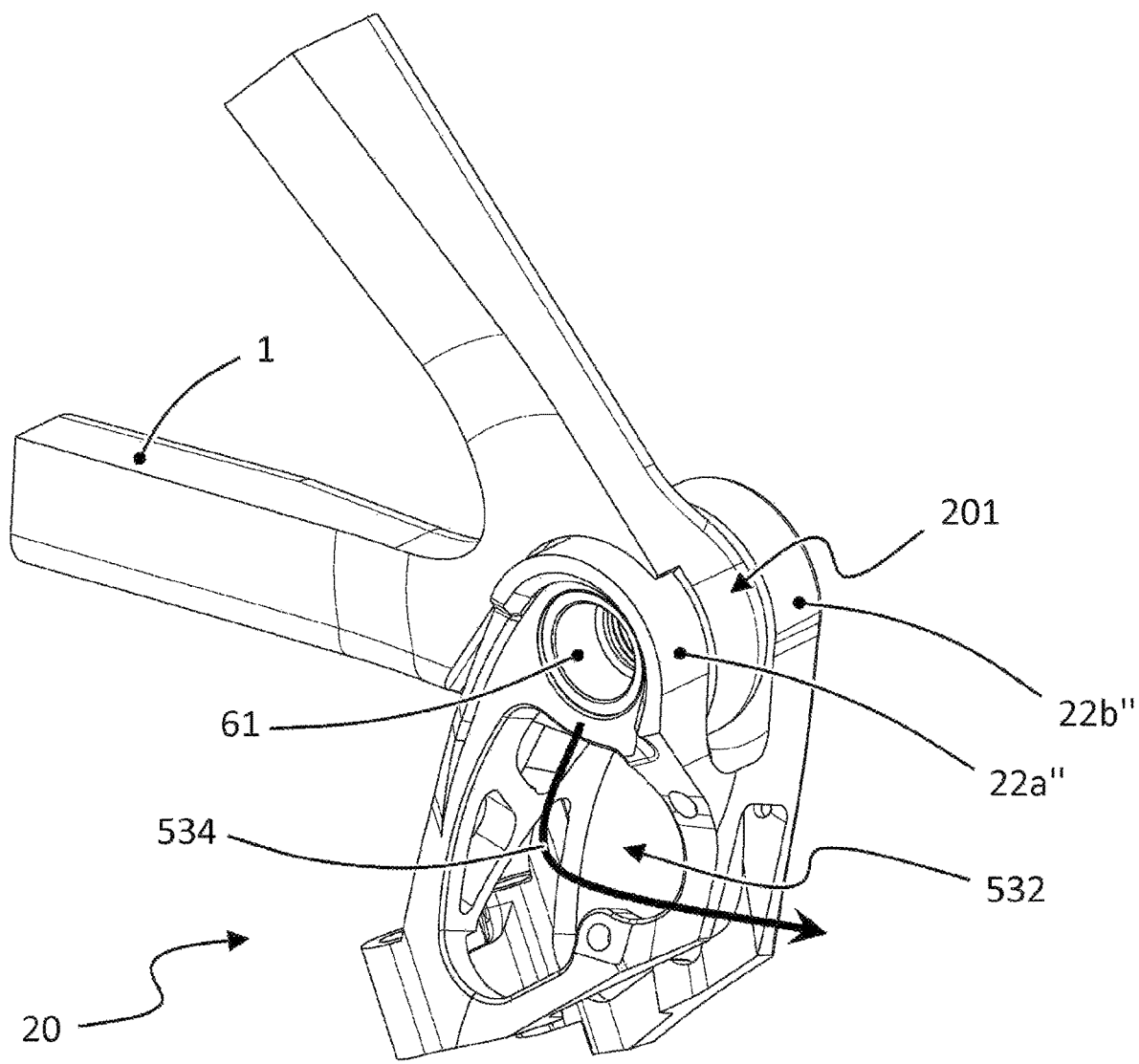
FIG. 6 shows, in a perspective inside view, the base element, installed on the bicycle frame, of a rear gearshift mechanism according to a fourth exemplary embodiment.
Figure 7:
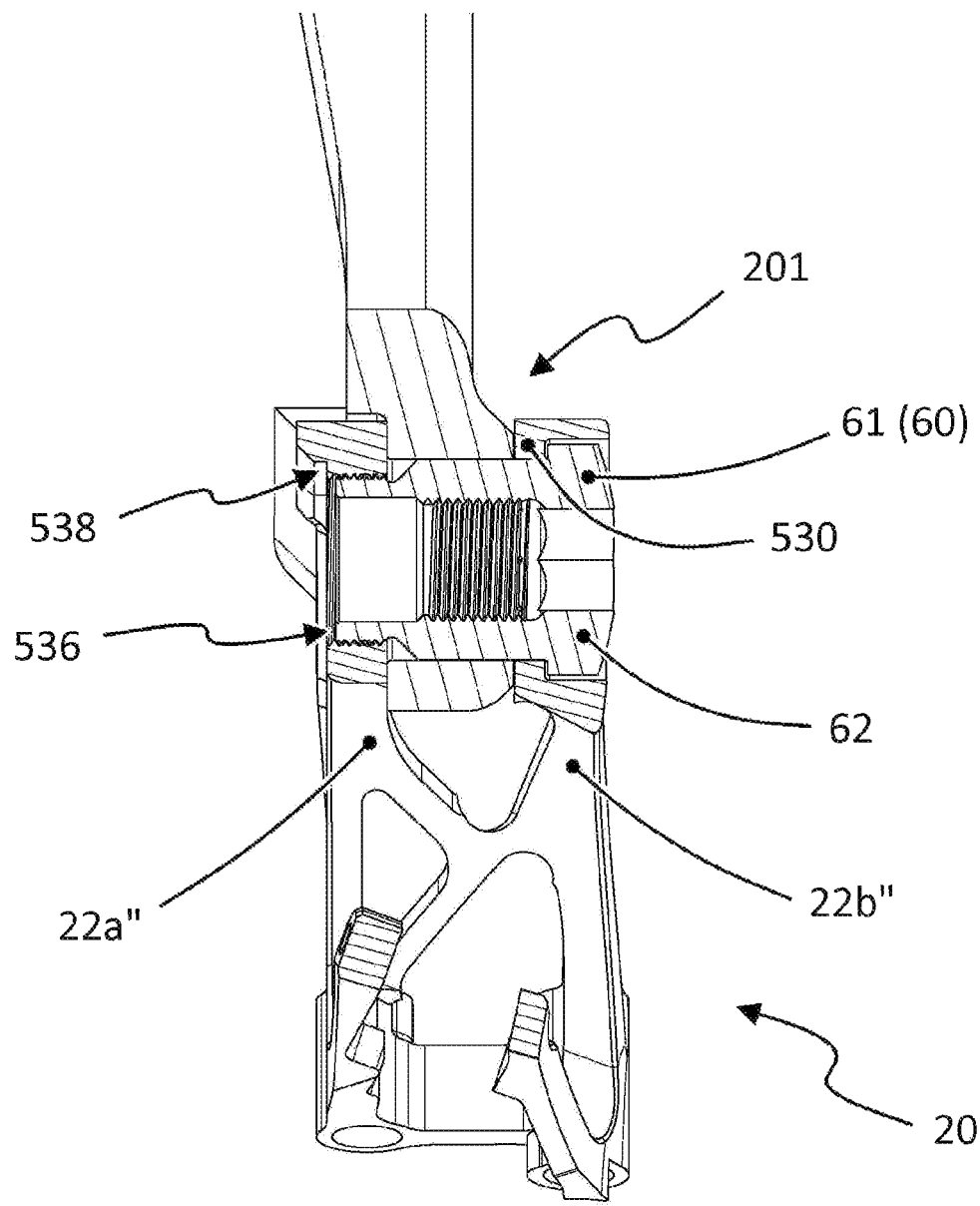
FIG. 7 shows the base element, installed on the frame, of FIG. 6 in a sectional view from the rear.

FIGS. 6 and 7 show a further embodiment of a coaxial gearshift mechanism connection. With this embodiment, the number and complexity of the required individual parts, and thus the costs incurred during the production and installation, are reduced.

As can be seen in particular in FIG. 7, this embodiment does not require the adapter nut of the embodiment described above, because the adapter bolt 61, which alone forms the adapter 60, is in this case screwed directly into the first arm 22a", on the left in the drawing, of the base element (B knuckle) 20. Thus, when the adapter bolt 61 is tightened, at least the first arm 22a" is braced directly against corresponding abutment end surfaces on the frame hanger 201. In the fully installed state, the right-hand hub end cap 4 of the rear-axle arrangement (see FIG. 1 and FIG. 5) abuts against a ring end surface 536 of the adapter bolt 61 or directly against the base element (B knuckle), specifically against a ring surface region 538 of the first arm 22a" thereof.

The second arm 22b" of the base element 20 of the embodiment shown is, by contrast to the embodiments described above, formed with a ring flange 530 which, when the adapter bolt 61 is tightened, is clamped between the bolt head 62 and an outside abutment end surface on the frame hanger 201. Depending on tolerances, in the case of this fixed clamping to the frame hanger 201 on both sides, the base element 20 may be slightly elastically deformed by virtue of the two arms 22a", 22b" of the base element being bent toward one another.

Thus, in this embodiment, the base element 20 is connected substantially non-displaceably to the frame hanger 201, irrespective of whether or not a plug-in axle 7 has been inserted and tightened. This means in particular that, here, even when the plug-in axle has been released and/or removed, the gearshift mechanism can no longer be rotationally pivoted, in particular also can no longer be rotationally pivoted rearward in the clockwise direction (in FIGS. 14 and 15). The rear wheel can thus not be readily removed, as in the case of conventional systems, by virtue of the gearshift mechanism 10 being pivoted rearward and then the rear wheel being removed vertically downwards.

For this reason, in this embodiment, the base element 20 is of special design at its inner, first arm 22a", specifically with a cutout 532 for wheel dismounting purposes, which cutout can be seen in particular in FIG. 6. The running gear can thus nevertheless be easily removed without the need to pivot the gearshift mechanism. For this purpose, it is merely necessary for the plug-in axle to be released and removed, following which the rear wheel can be removed from the rear-end structure along the removal path 534 indicated in FIG. 6. It is pointed out that such a design of the base element is also generally advantageous and may be used in all relevant embodiments of a rear gearshift mechanism installed on the frame in a manner coaxial relative to the rear-wheel axis, in order that the rear wheel can be dismounted without pivoting the gearshift mechanism.

Figure 8:
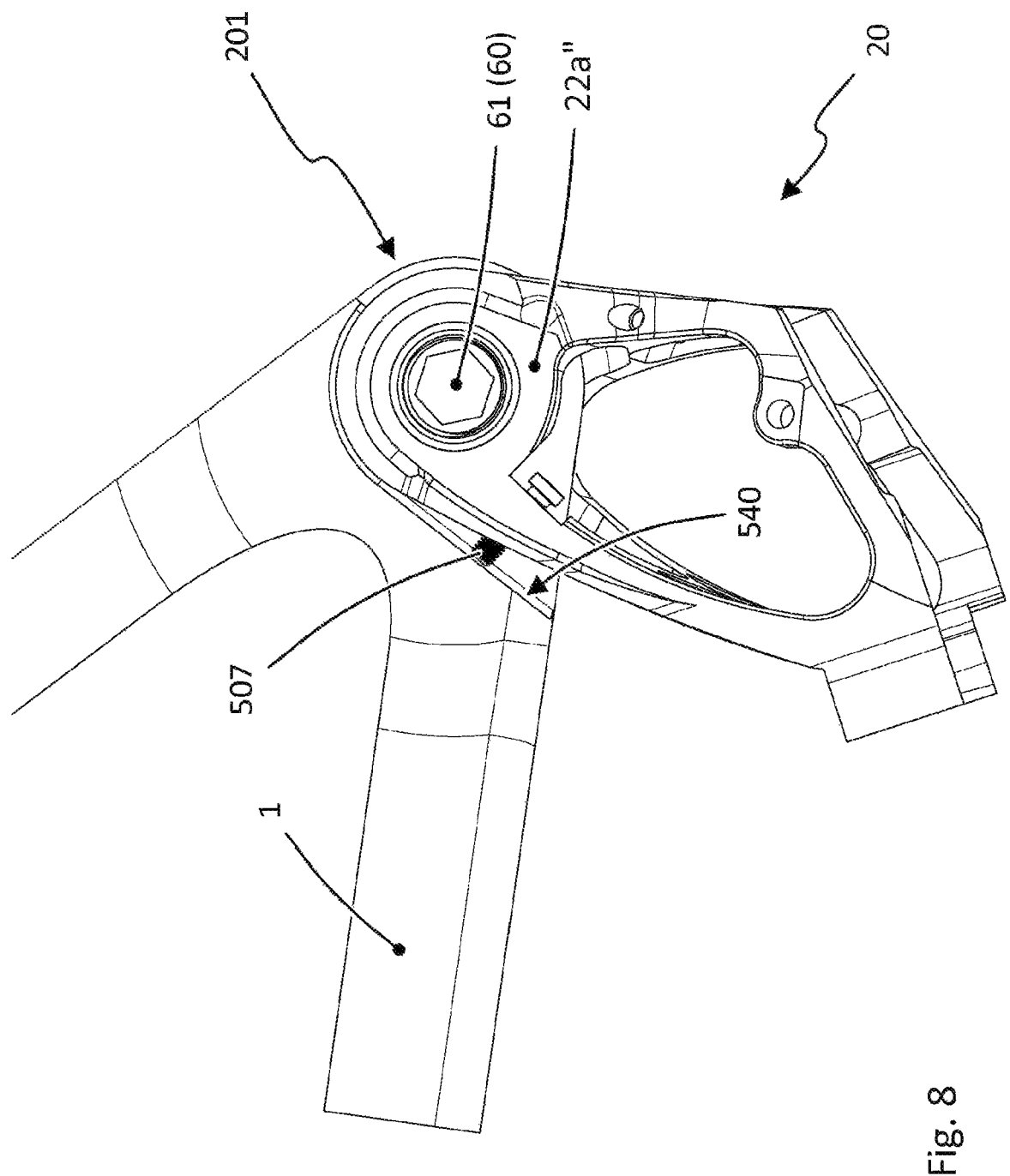
FIG. 8 shows, in an inside view, the base element, installed on the bicycle frame, according to a design variant in relation to the embodiment of FIGS. 6 and 7.
Figure 9:
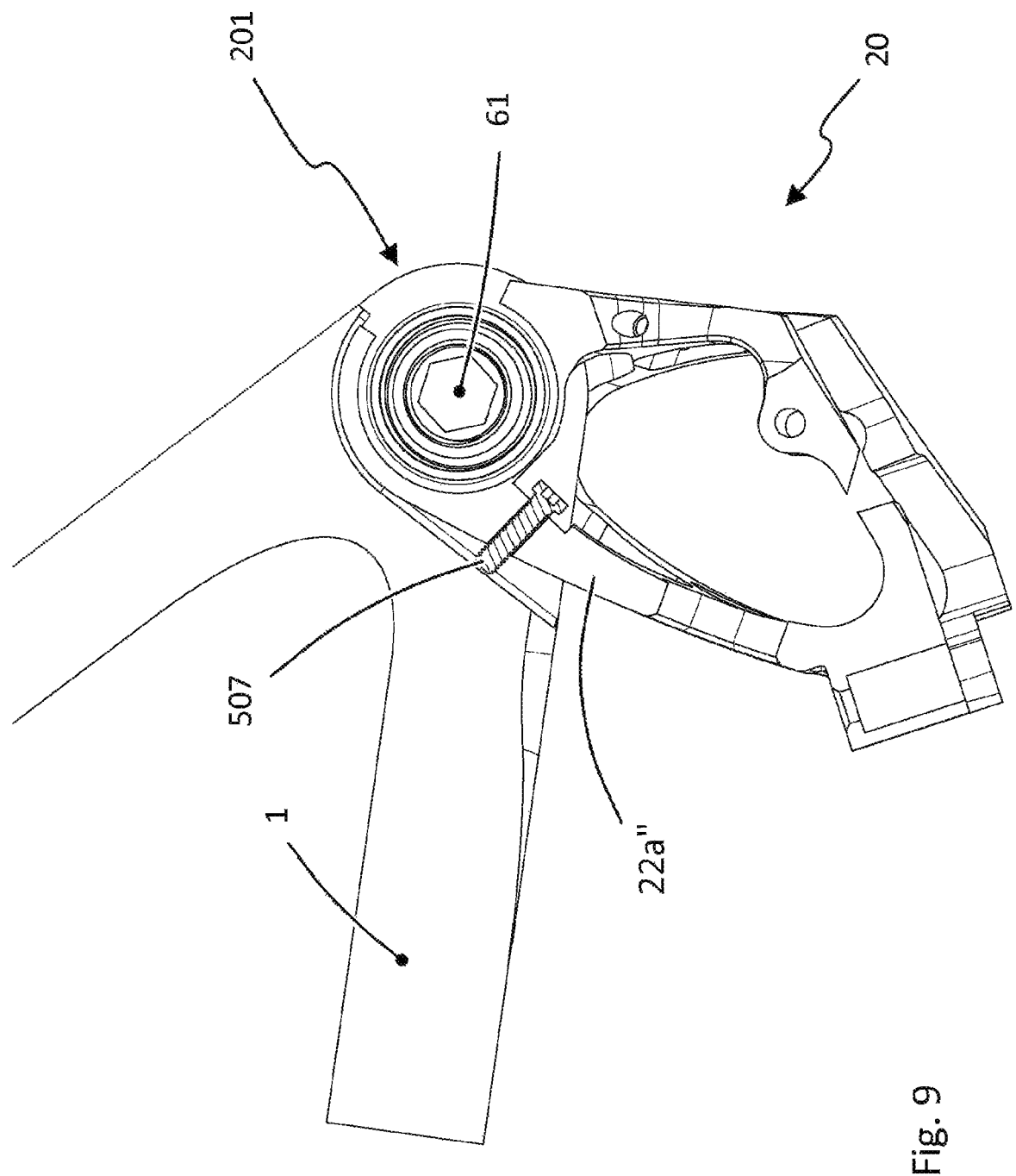
FIG. 9 shows, in a partially sectional inside view, the base element, installed on the bicycle frame, according to the design variant of FIG. 8.

It is also the case in the embodiment of FIGS. 6 and 7 that an abutment screw or adjustment screw (B screw) may additionally be provided. One possible arrangement of the adjustment screw (B screw) is shown in FIGS. 8 and 9, which illustrate a corresponding design variant. The adjustment screw 507 abuts for example directly against the frame, at an abutment surface 540. The setting of the correct chain gap before the adapter bolt 61 is tightened is facilitated by the adjustment screw 507. The manually actuatable setting device is formed by a portion, which serves as threaded pedestal, of the base element 20, in particular of the first arm 22a" or second arm 22b" thereof (preferably of the first arm 22a"), the adjustment screw 507, and the abutment surface 540 on a frame formation of the frame hanger or adjacent to the frame hanger 201. This design variant otherwise corresponds in an identical manner to FIGS. 6 and 7.

Figure 10:
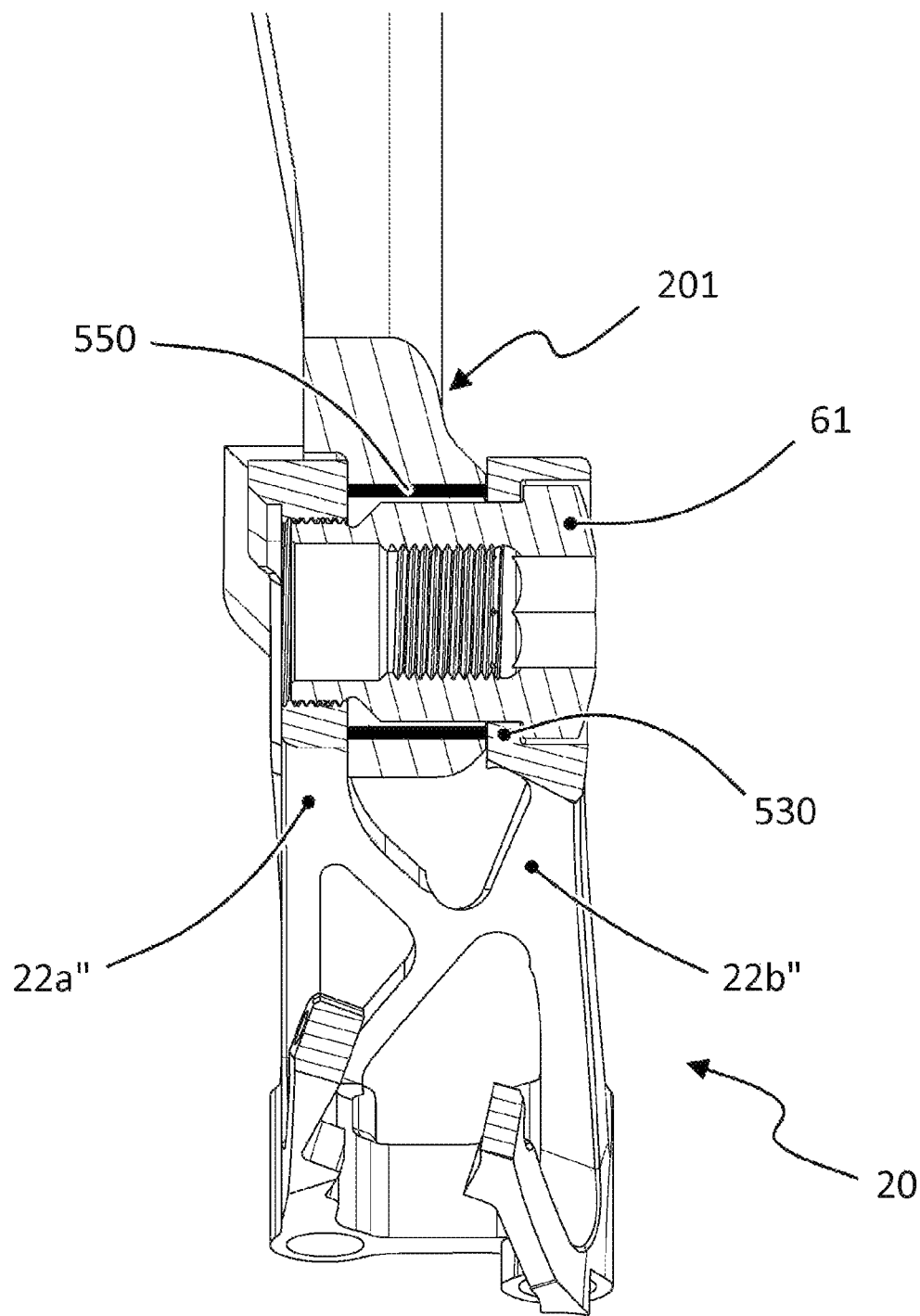
FIG. 10 shows a further design variant in relation to the embodiment of FIGS. 6 and 7, in a sectional view corresponding to FIG. 7.

FIG. 10 schematically shows a further variant of the embodiments of FIGS. 6 to 9. This consists in that a spacer sleeve 550 is arranged radially between the outer circumference of the adapter bolt 61 and the inner circumference of the bore of the frame hanger 201. The spacer sleeve 550 has the effect that, when the adapter bolt 61 is tightened in the internal thread of the first arm 22a", the clamping between the two arms 22a", 22b" of the base element 20 and of the spacer sleeve 550 is realized. With corresponding dimensioning of the length of the spacer sleeve 550, no clamping of the arms 22a", 22b" of the base element 20 against the end surfaces of the frame hanger 201 thus occurs, as is the case in the preceding embodiments of FIGS. 6 to 9 (see in particular FIG. 7). The base element 20 thus initially remains freely rotatable about the rear axle even after the tightening of the adapter bolt 61.

In this respect, the embodiment of FIG. 10 thus corresponds to the embodiment of FIG. 5. For this reason, the embodiment of FIG. 10 also requires a preferably adjustable front or forward abutment, which is particularly expediently realized by a setting screw, similarly to that in FIGS. 2-4, 8 and 9. In this regard, the design variant of FIG. 10 may for example correspond to the design variant of FIGS. 8 and 9.

Figure 11:
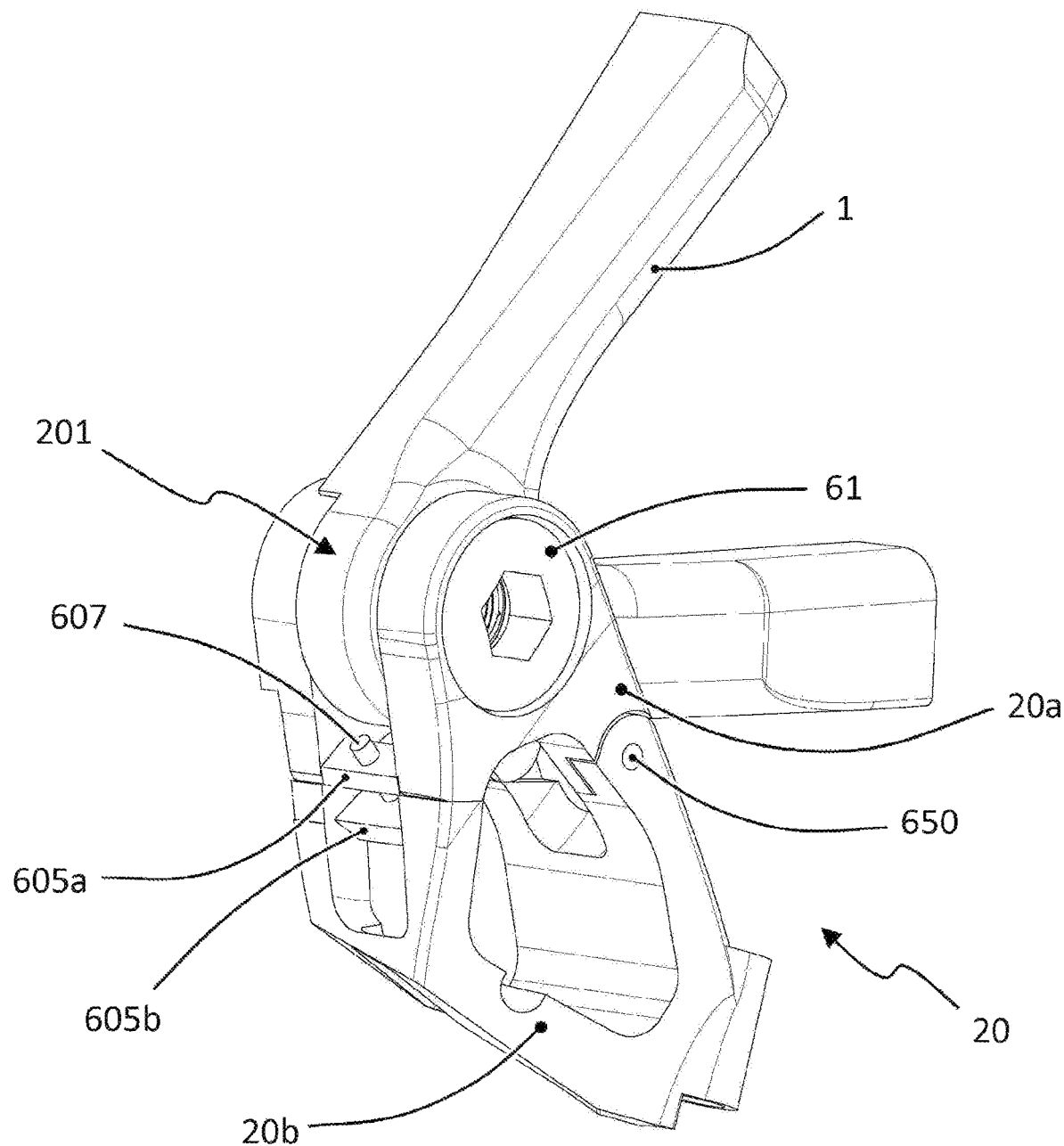
FIG. 11 shows, in a perspective outside view, a base element, which is installed on a bicycle frame and which has two sub-elements which are pivotable relative to one another, of a rear gearshift mechanism according to a fifth exemplary embodiment.
Figure 12:
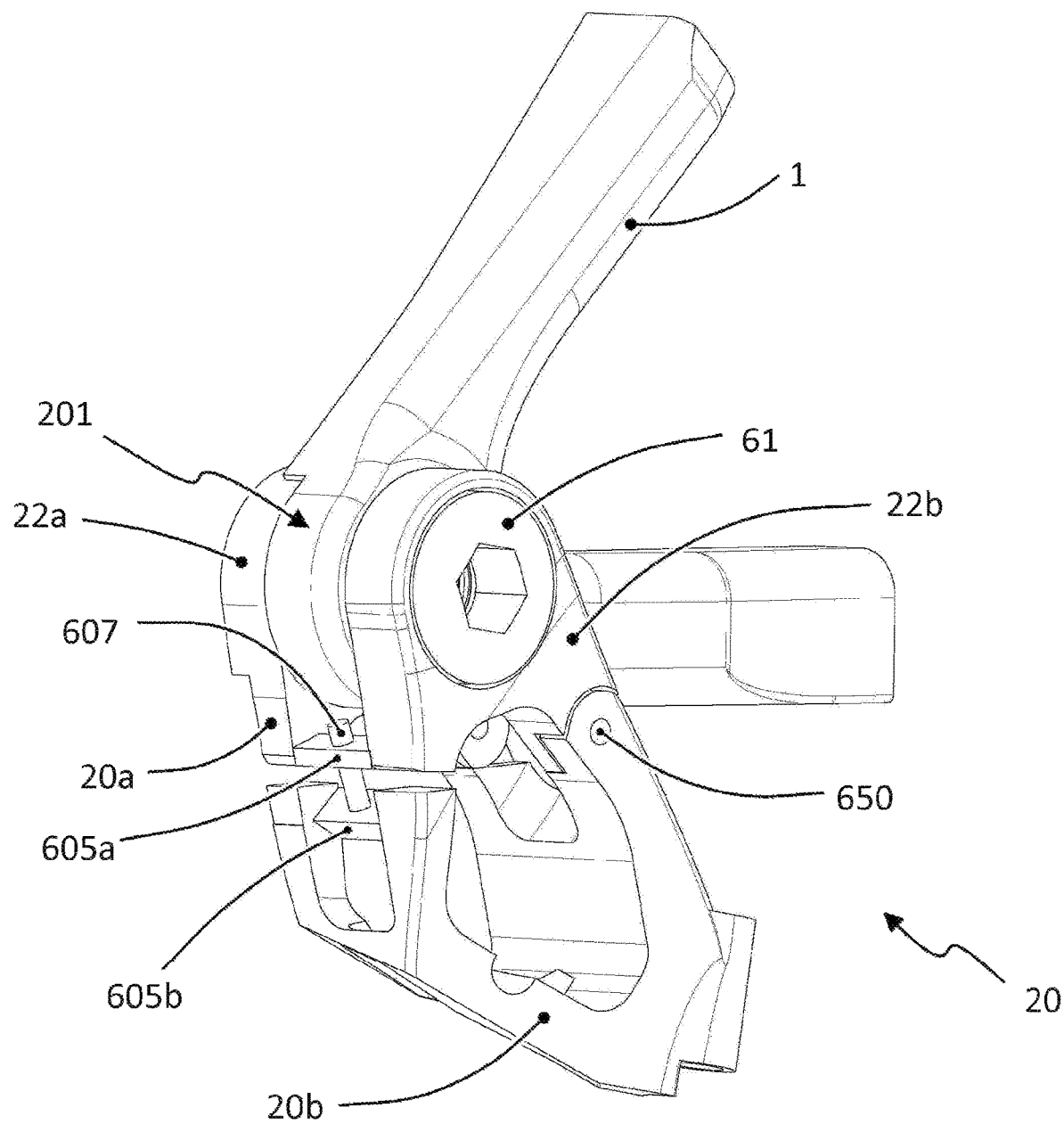
FIG. 12 shows the base element of the fifth exemplary embodiment in a perspective view corresponding to FIG. 11, with a slightly increased pivot angle of the two sub-elements relative to one another in relation to FIG. 11.

FIGS. 11 to 13 show a further embodiment of a coaxial gearshift mechanism connection. In this embodiment, too, the setting of the chain gap is performed, as in the preceding embodiments, firstly by the rotational pivoting position of the entire base element (B knuckle) 20 with respect to the frame hanger 201. Since, in this embodiment, the base element 20 is formed in two parts, with a first sub-element 20a installed on the frame hanger 201 and a second sub-element 20b which is pivotable relative to the first sub-element by an additional joint 650, the "chain gap" or the chain tension can be altered or finely adjusted at a later point in time as required by virtue of the pivoting position of the second sub-element 20b being by an adjustment screw 607.

Various possibilities exist with regard to the implementation of the setting device which has the adjustment screw 607. In the embodiment shown here, the adjustment screw 607 (illustrated here merely schematically) is subjected to tensile loading during operation, or on the basis of the chain tension. For this purpose, of the element 605a of the first sub-element 20a and the element 605b of the other sub-element 20b, one element may be designed as a threaded pedestal and the other element may be designed as a rotary bracket which supports the adjustment screw at least with regard to tension. The adjustment screw 607 is in screwed engagement with the threaded pedestal and is held rotatably in the rotary bracket. From a comparison of FIGS. 11 and 12, which show different pivot angles between the sub-elements, it can be seen that the element 605a is designed as a rotary bracket and, accordingly, the element 605b is designed as a threaded pedestal.

Another possibility is for both elements 605a and 605b to be designed as threaded pedestals, which have oppositely oriented internal threads, with which the adjustment screw is in screwed engagement.

FIG. 14 shows, by way of example, a bicycle with a bicycle drive. The bicycle drive comprises a front sprocket CR, a rear pinion assembly R, and a chain K which can be moved from one pinion to the next by the rear gearshift mechanism RD. The directional terms right/left and front/rear used below relate to a bicycle in a direction of travel. The bicycle frame 1 has a left-hand and a right-hand rear dropout or frame hanger, between which the rear wheel is installed. The rear wheel rotates together with the pinion assembly R about the rear-wheel axle A. "Axially" relates to the rear-wheel axle A or the axis of rotation A of the multi-pinion arrangement R. The largest pinion is situated axially further to the inside than the smaller pinions. The teeth are arranged radially at the outside on the pinions. The outer diameter of a pinion is the radially outer end, and the inner diameter is the radially inner end of the pinion. The gearshift mechanism rear derailleur ("RD") shown here is fastened in the conventional manner by a derailleur hanger to the right-hand dropout of the frame. Thus, the known gearshift mechanism RD is spaced apart from the rear-wheel axis A and is installed non-coaxially with respect thereto. The gearshift mechanism RD rotates about the B axis, which is spaced apart from the axis A. The pivot mechanism of the gearshift mechanism is designed as an oblique parallelogram.

By contrast, the following FIGS. 15 to 23 show a rear gearshift mechanism which is installed or installable in a manner coaxial with respect to the rear-wheel axis, and the associated rear-wheel axle arrangement, in various stages of installation and on different scales for improved understanding of this known solution which constitutes a departure from FIG. 14.

FIG. 15 shows a perspective view of the known rear gearshift mechanism 10 of EP '324, that is to say the published application EP 3 388 324 A2. The rear gearshift mechanism 10 is installed coaxially on the rear-wheel axle 6. For better clarity, the rear wheel and the pinion assembly have not been illustrated. It is possible to see the rear-wheel hub 3, which is arranged between the two dropouts of the frame 1, and the gearshift mechanism 10, which engages around the right-hand dropout. The base element 20 is installed on the frame 1 coaxially with respect to the axis A by the adapter 60.

Figure 16:
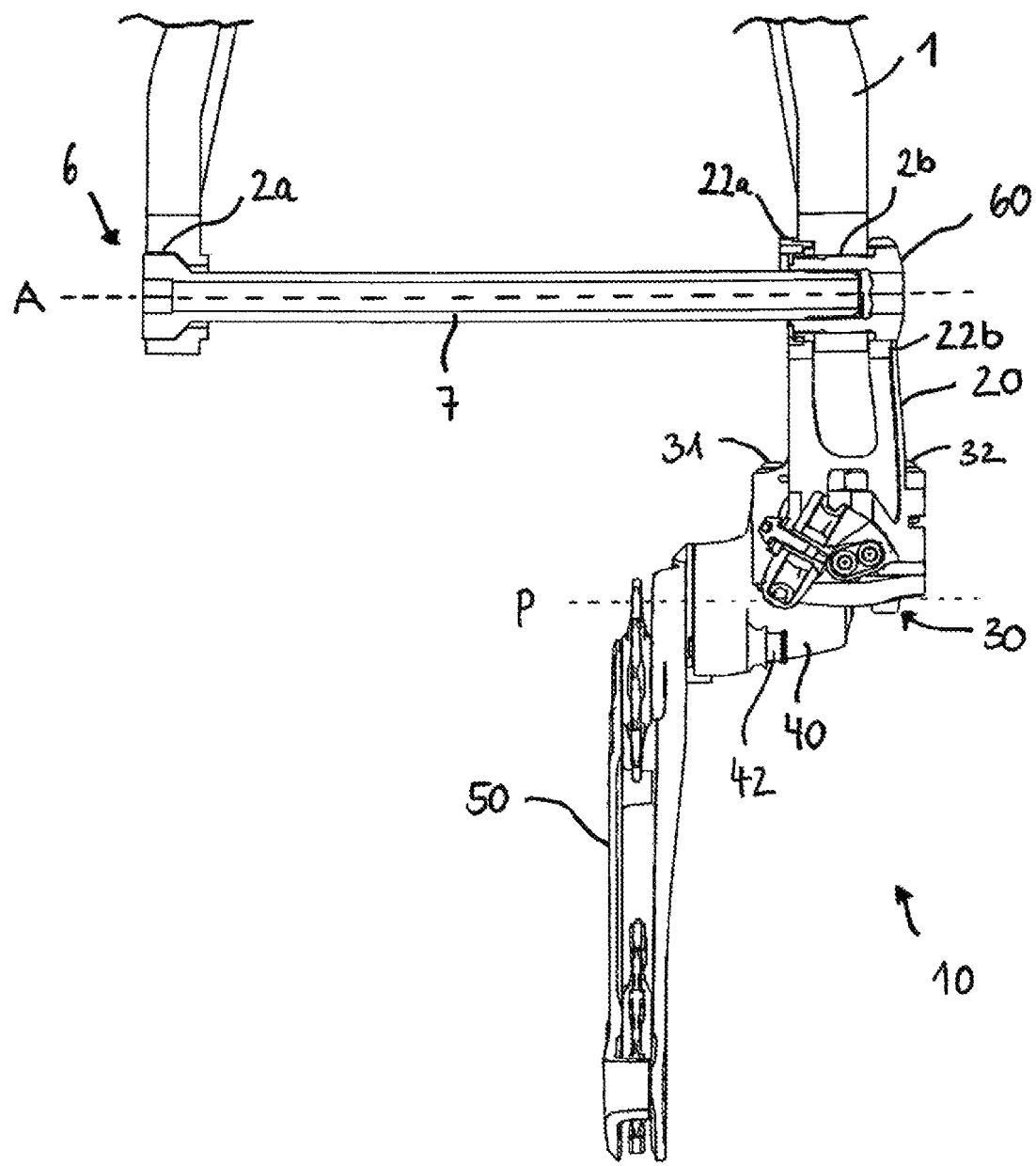
FIG. 16 shows a sectional illustration of FIG. 1 along the axis A without hub arrangement, corresponding to FIG. 2 of EP '324.

FIG. 16 shows a section along the axis A of the gearshift mechanism 10 illustrated in FIG. 1 in a rear view. The geometrical axis A extends along the rear-wheel axle 6. For the sake of simplicity, only the plug-in axle 7 and not the other parts of the axle and hub arrangement are shown in this illustration. The base element 20 is fastened to the right-hand dropout by the adapter 60. For this purpose, the adapter 60 engages through the right-hand frame opening 2b. The plug-in axle 7 is inserted into the left-hand frame opening 2a and screwed together with the adapter 60. The adapter 60 simultaneously serves as a counternut for the plug-in axle 7. When the plug-in axle 7 is tightened, it is screwed further into the adapter 60 and is clamped relative to the frame 1.

Figure 17:
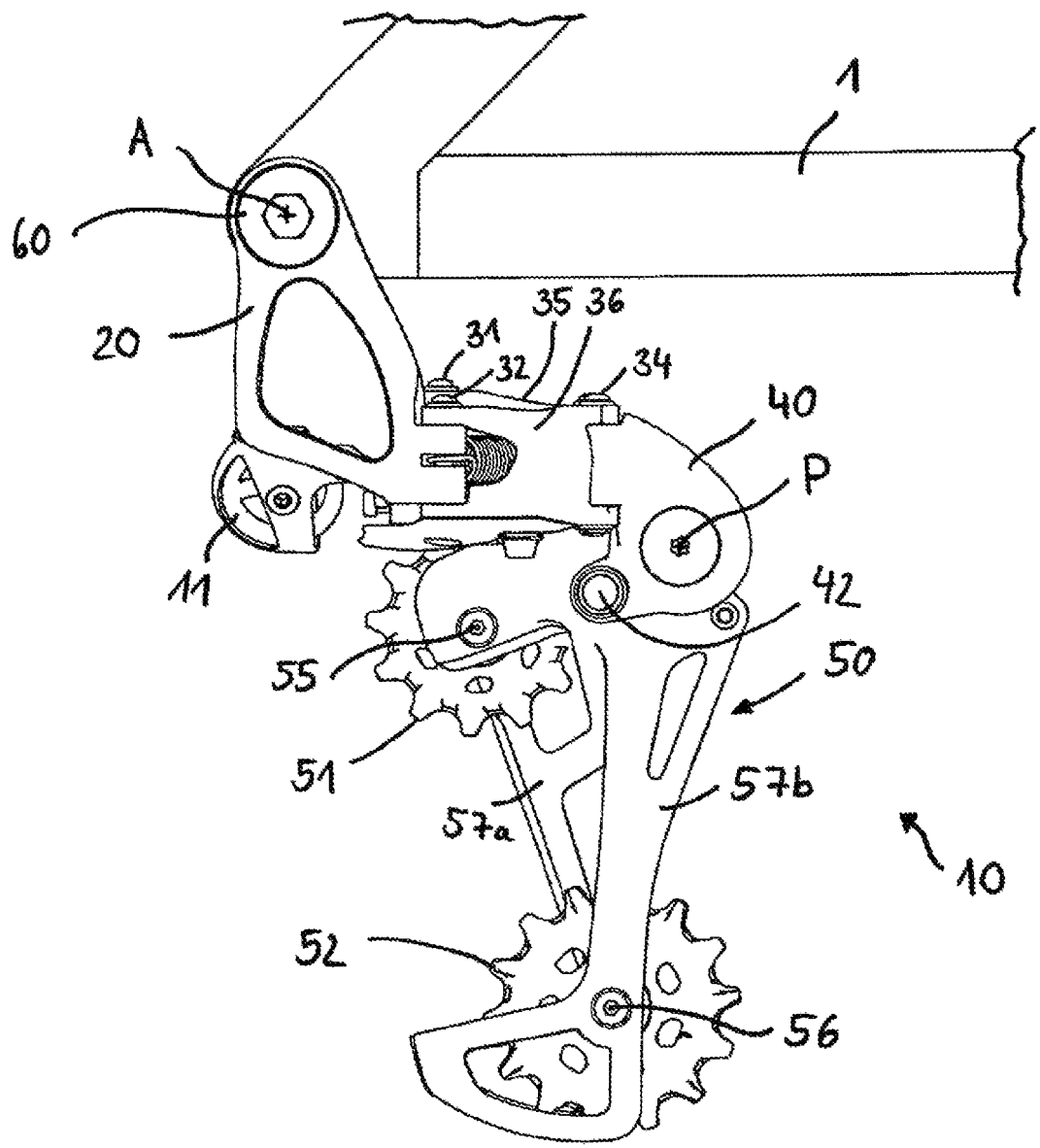
FIG. 17 shows a side view of the gearshift mechanism of FIG. 1, corresponding to FIG. 3 of EP '324.

FIG. 17 shows a side view of the gearshift mechanism 10 from FIG. 2 installed on the frame 1 in a manner coaxial with respect to the rear-wheel axis. FIGS. 15 to 17 each show the entire gearshift mechanism 10 with the base element 20, the pivot mechanism 30, the movable element 40 and the chain guide arrangement 50. On the base element 20, there is arranged a cable diverting means 11, in this case in the form of a cable diverting roller mounted rotatably at the attachment point 29c. The base element 20 is, at its first, upper attachment end, installed on the frame 1 coaxially with respect to the rear-wheel axis A. For this purpose, two arms, which are spaced apart from one another in an axial direction, of the base element 20 engage around the dropout of the frame 1, such that one arm is arranged on the inner side of the frame 1 and the other arm is arranged on the outer side of the frame 1. The base element 20 is pre-installed on the frame 1 by the adapter 60.

Furthermore, the base element 20 is coupled at its second, lower attachment end to the pivot mechanism 30. The pivot mechanism 30 is designed as a parallelogram four-joint mechanism with an inner pivot arm 35, an outer pivot arm 36 and four pivot axles 31, 32, 33, 34. The four pivot axles 31, 32, 33, 34 run in each case in planes which intersect the axis A at right angles. In other words, the pivot axles 31, 32, 33, 34 lie in planes which extend parallel to the pinion planes (not show here). The first and second pivot axles 31, 32 connect the pivot mechanism 30 to the base element 20. The third and fourth pivot axles 33, 34 connect the pivot mechanism 30 to the movable element 40. Both the base element 20 and the movable element 40 have in each case two receptacles for the pivot axles. The longitudinal axes L1, L2 of the receptacles on the base element 20 and the longitudinal axes of the receptacles on the movable element 40 are, like the pivot axles 31, 32, 33, 34 themselves, oriented orthogonally with respect to the rear-wheel axle 6 or the axis A (see, FIGS. 18 to 23).

The chain guide arrangement 50 is connected, to be rotatable about the axis P, to the movable element 40 and is preloaded clockwise (rearward), such that a chain (not shown here) which runs through the chain guide 50 in S-shaped fashion is tensioned. The chain guide arrangement 50 comprises an upper and a lower chain guide roller 51, 52, which chain guide rollers are each mounted rotatably between two cage halves 57a, 57b. The upper chain guide roller 51 is arranged, to be rotatable about the upper axis of rotation 55, with an upper spacing to the axis P. The lower chain guide roller 52 is arranged, to be rotatable about the lower axis of rotation 56, with a lower spacing to the P axis, wherein the upper chain guide roller 51 is arranged with a smaller spacing to the P axis than the lower chain guide roller 52. The movable element 40 has a locking element 42 which makes it possible for the preloaded chain guide arrangement 50 to be fixed relative to the movable element 40. It is thus possible for the gearshift mechanism 20 to be installed without the chain guide arrangement 50 snapping backwards owing to the preload.

During shifting to a smaller pinion, the chain guide arrangement 50 rotates clockwise (rearwards) about the axis of rotation P of the movable element 40. Conversely, during shifting to a next larger pinion, the chain guide arrangement 50 rotates counterclockwise (forwards) about the axis of rotation P. As a result of the rotational movement about the axis P, the upper chain guide roller 51 is moved radially towards or away from the pinions. The chain guide arrangement 50 is moved in an axial direction by virtue of the pivot arms 35, 36 being pivoted about the pivot axles 31, 32, 33, 34. Depending on shifting direction, the upper chain guide roller 51 together with the entire chain guide arrangement 50 moves inwards or outwards in an axial direction.

Figure 18:
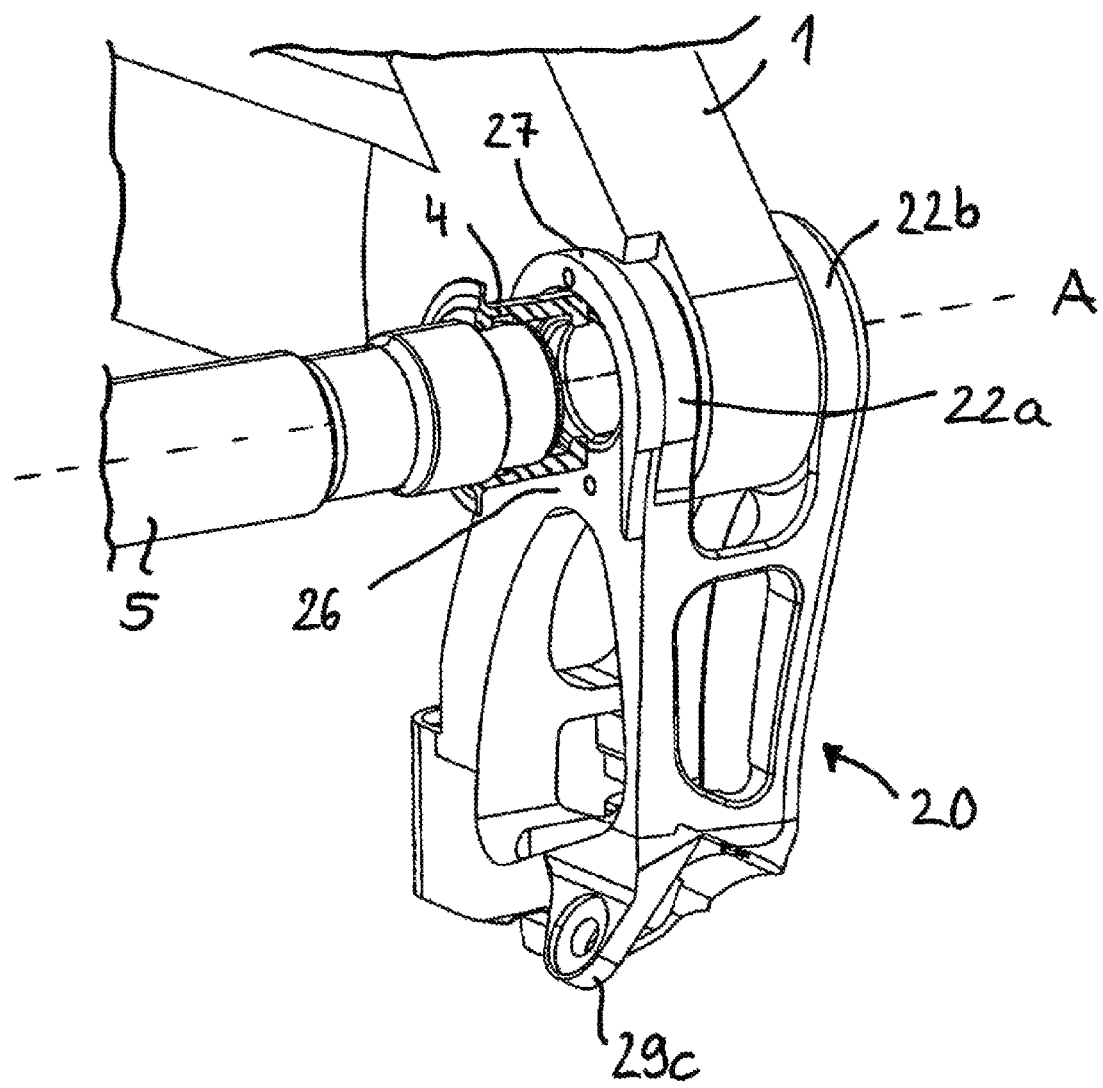
FIG. 18 shows a perspective inside view of the base element installed on the frame, corresponding to FIG. 4 of EP '324.

FIGS. 18 and 19 show in each case perspective partial sections of the base element 20 installed on the frame 1 by the adapter 60, and parts of the hub arrangement. The first arm 22a and the second arm 22b are positioned in each case on one side of the frame 1. For the installation of the rear wheel (not shown here), said rear wheel is guided together with the hub arrangement (only the hollow axle or hub axle 5 is shown here) and the hub end cap 4 along the hub guide 27 on the inner side of the base element 20. The hub guide 27 is designed as a collar with guide surfaces which taper towards one another. In its end position, the hub end cap 4 bears radially against the hub guide 27. In an axial direction, the hub end cap 4 abuts against the axial hub abutment surface 26 on the inner side of the base element 20. The hub end cap 4 is illustrated sectioned in FIG. 19.

FIG. 19 shows a section through the base element 20 with the two arms 22a, 22b which engage around the adapter 60. The adapter 60 is composed of the bolt 61 and the nut 66. The bolt 61 is screwed into the nut 66, such that the bolt head 62 and the nut 66 are clamped to the frame 1. The adapter 60 can thus be fixed relative to the frame 1. The base element 20 is centered on the adapter 60. In the rideable state, when the plug-in axle 7 has been tightened, the base element 20 is clamped rotationally fixedly between the hub end cap 4 and the adapter 60. In the fully installed state, the base element 20 bears in the axial direction only against the hub end cap 4 and against the adapter 60. The base element 20 is installed on the frame 1 indirectly by the adapter 60. The base element 20 and thus the gearshift mechanism 10 as a whole is referenced in relation to the hub 4—and not, as is conventional, in relation to the frame 1.

FIG. 20 shows the enlarged partial section of the base element 20 from FIG. 19 installed on the frame 1 by the adapter 60. The bolt head 62 and the nut 66 are dimensioned to be larger than the frame opening 2b. When the adapter 60 has been tightened, the bolt head 62 and the nut 66 bear in frictionally engaging fashion against the frame 1. The nut 66 has a knurled surface 69 in order to additionally produce a positively locking connection with respect to the frame 1 and counteract a forwards (counterclockwise) rotation of the gearshift mechanism 10. The bolt body 63 has an abutment region 63a, which bears with a small amount of play against the frame opening 2b, and a compensation region 63b, which has a greater amount of play in relation to the frame opening 2b. The compensation region 63b makes it possible for the adapter 60 to align along the axis A in the frame opening 2b. The bolt 61 has an amount of play in the frame opening 2b and can tilt slightly therein if the frame opening is not exactly aligned with the axis A.

Figure 21:
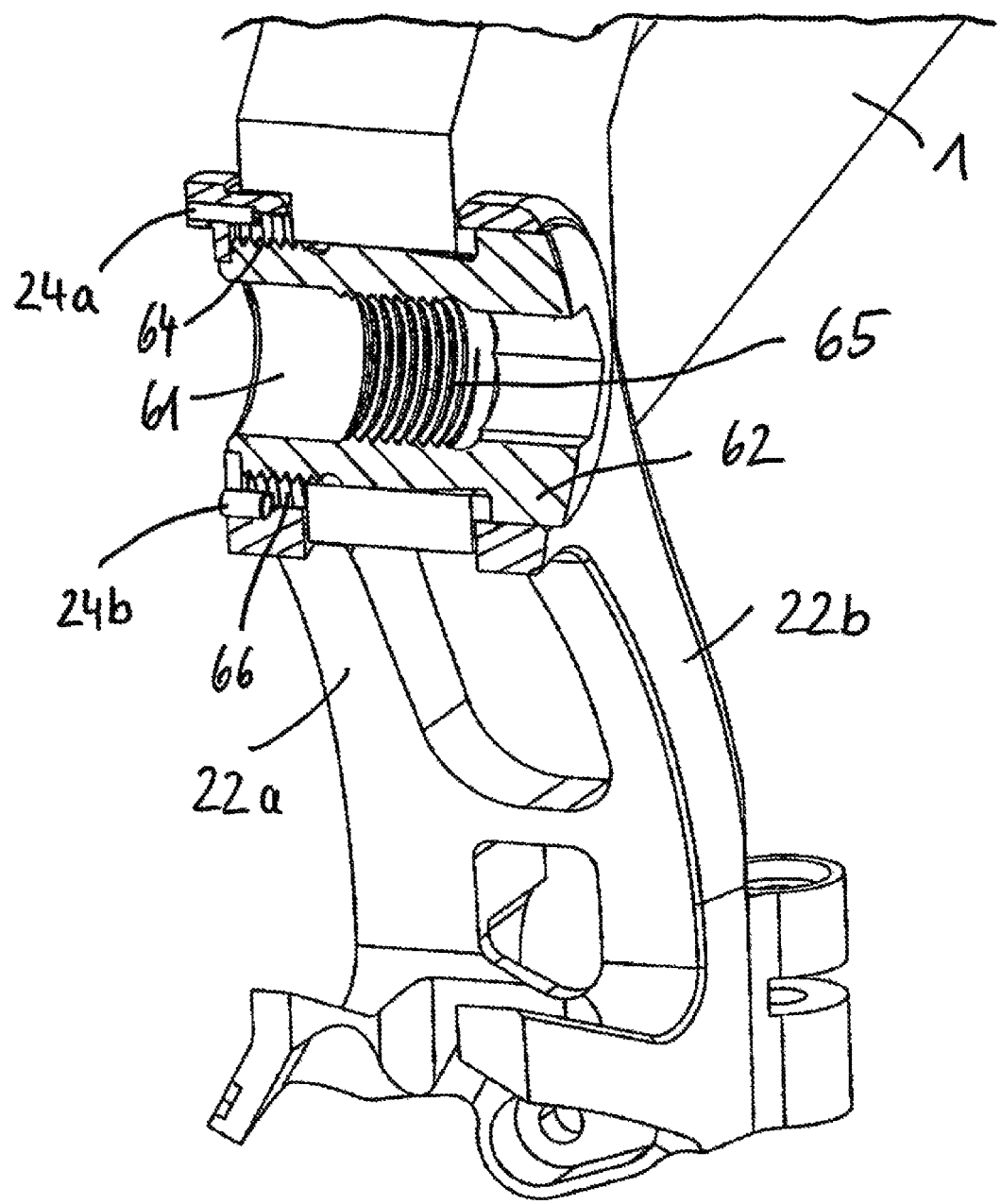
FIG. 21 is a fully sectional illustration of the arrangement from FIG. 20, corresponding to FIG. 7 of EP '324.

FIG. 21 shows the arrangement from FIG. 20 with the adapter 60 shown in section. The adapter 60 has two tasks: 1) the clamping on the frame 1 is produced by the screw connection between bolt 61 and nut 66. It would alternatively also be possible for the nut to be arranged on the outside and for the bolt to be arranged on the inside. It is important that the adapter 60 is fixable relative to the frame 1 and adaptable to said frame in an axial direction. The screw connection is tightened further in the case of a relatively thin frame than in the case of a relatively thick frame. 2) The adapter 60 is rotatable clockwise relative to the base element 20 only to a limited extent and thus constitutes a rotation prevention means and a forward abutment. For this purpose, two abutments 68a, 68b are arranged on the nut 66, which abutments interact with two pins 24a, 24b on the base element 20. A forwards (counterclockwise) rotation of the gearshift mechanism 10 is possible only to a limited extent owing to the rotation prevention means between adapter 60 and base element 20. The rotation prevention means replaces the conventional B screw and protects against undesired forwards rotation of the gearshift mechanism. The pivoting position of the base element 20 on the frame 1 that is defined by the abutment of the pins 24a, 24b against the abutments 68a, 68b results in a corresponding tension of the chain guided by the chain guide arrangement 50, and in a corresponding spacing of the uppermost chain guide roller to a reference pinion of the pinion assembly (so-called "chain gap").

The external thread 64 and the internal thread 65 of the bolt 61 are arranged in different regions along the bolt 61 in order to thereby be able to better accommodate forces. The plug-in axle 7 is screwed into the internal thread 65 and pulls the adapter 60, in particular the bolt head 62, against the outer side of the frame 1. In the exemplary embodiment shown, a washer is arranged between the bolt head 62 and the frame 1.

Figure 22:
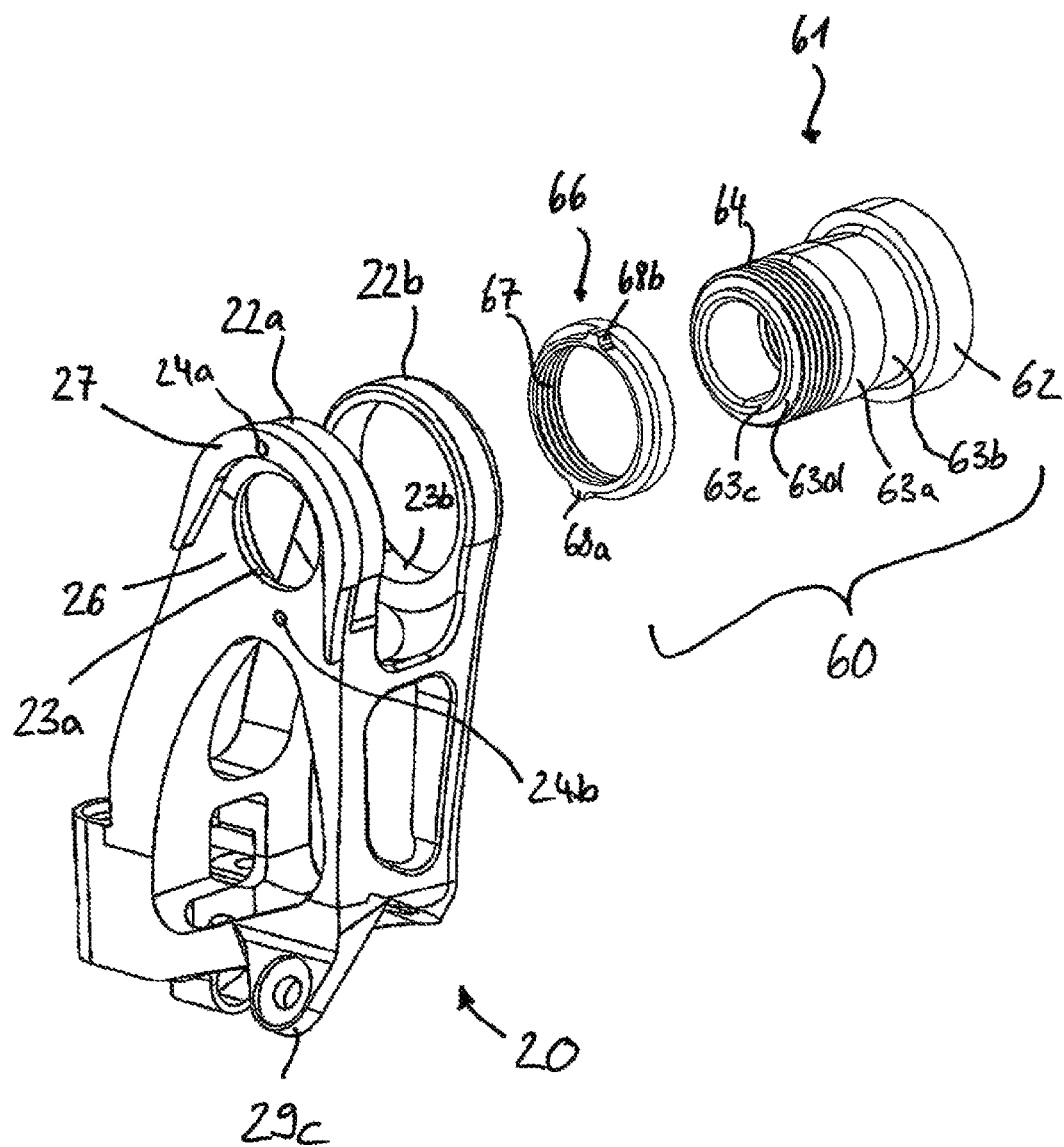
FIG. 22 shows an exploded illustration of the base element and of the adapter, corresponding to FIG. 8 of EP '324.

In this regard, see also FIG. 22, an exploded illustration of the non-installed base element 20 and of the adapter 60 from FIG. 21. In this view, the internal thread 67 of the nut 66 and the external thread 64 of the bolt 61, which together form the screw connection of the adapter 60, can be clearly seen. It would alternatively also be possible for the bolt to be screwed directly into a thread of the frame opening. Then, frame tolerances would however have a direct effect on the gearshift mechanism, which should be avoided. Furthermore, it is possible to see the bolt foot 63c adapted to the first centering opening 23a, and the bolt head 62 adapted to the second centering opening 23b. The abutment surface 63d of the bolt 61 interacts with the outer side, which is averted here, of the first arm 22a of the base element 20 (see, FIG. 23a).

FIGS. 23a and 23b show a perspective outside and inside view of the base element 20 with the first and second centering openings 23a, 23b. The first centering opening 23a is adapted to the outer diameter of the bolt foot 63c of the bolt 61. The second centering opening 23b is adapted to the outer diameter of the bolt head 62. On the outer side of the first arm 22a, it is possible to see the adapter abutment surface 25, which interacts with the abutment surface 63d of the bolt 61. The hub abutment surface 26 is arranged on the opposite, inner side of the first arm 22a. In the rideable state, the bolt 61 is clamped with the bolt abutment surface 63d against the outer side, and the hub end cap 4 is clamped against the inner side, of the base element 20. Situated at the lower attachment end of the base element 20 is the attachment point 29c for a cable diverting means 11. Furthermore, the first receptacle 29a for the first pivot axle 31 and the second receptacle 29b for the second pivot axle 32 of the pivot mechanism 30 (not shown here) are situated at the lower attachment end of the base element 20. The longitudinal axes L1, L2 of the first and second receptacles 29a, 29b run in planes which intersect the rear-wheel axis A in each case at right angles. The four pivot axles 31, 32, 33, 34 of the parallelogram four-joint mechanism 30 are thus oriented orthogonally with respect to the common pinion axis A irrespective of the selected relative position of the gearshift mechanism 10.

Reference is additionally also made to the further disclosure of EP '324, from which further design possibilities and design variants of the known rear gearshift mechanism 10 installed in a manner coaxial with respect to the rear-wheel axis A emerge, which may also be considered as design possibilities and design variants of a rear gearshift mechanism according to the various aspects of the disclosed embodiments, unless anything to the contrary emerges from the statements herein relating to the exemplary embodiments described herein.

Figure 24:
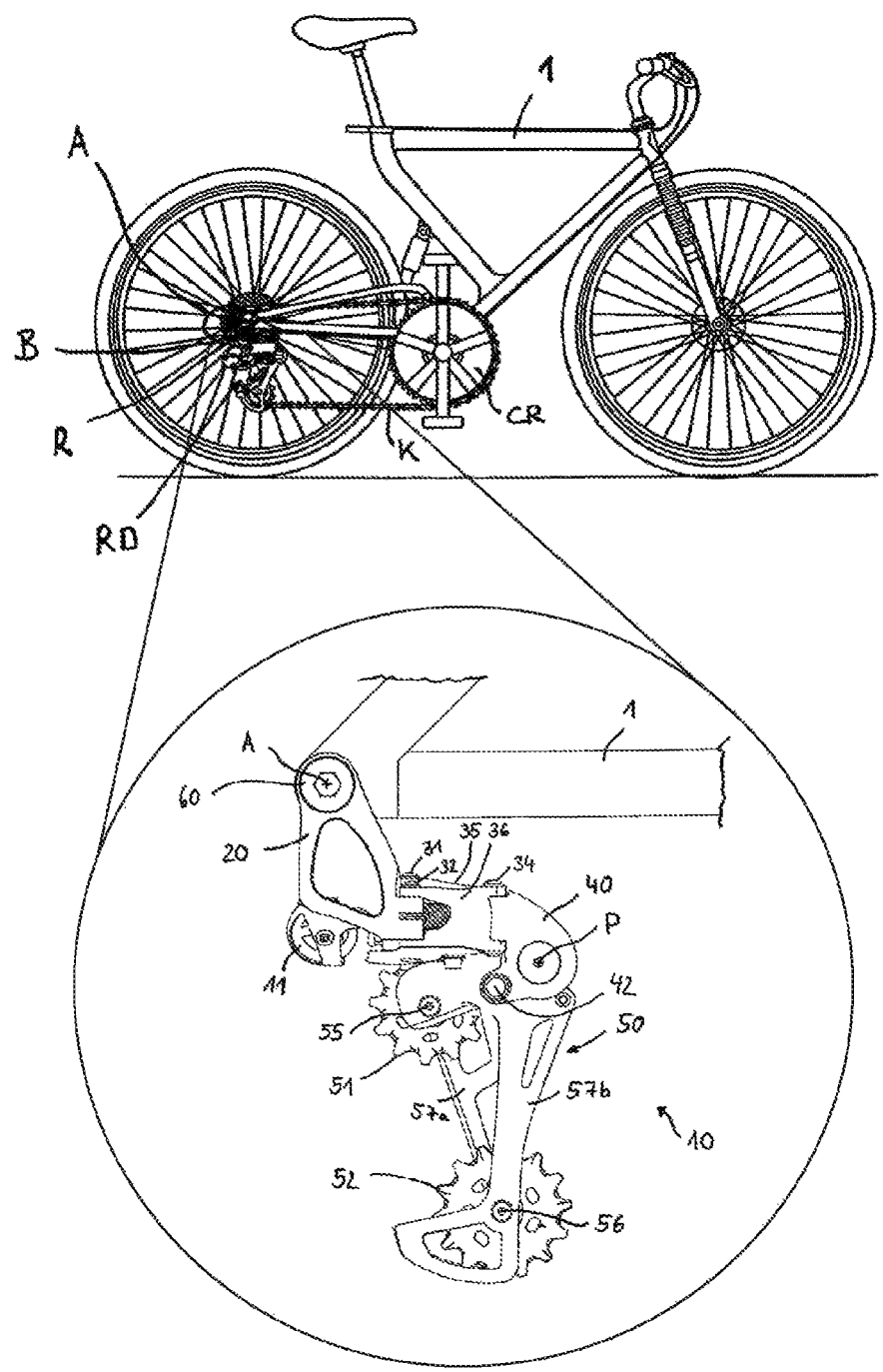
FIG. 24 shows a bicycle with a rear gearshift mechanism as an exemplary embodiment in a schematic illustration.

A bicycle according to an example embodiment is shown in FIG. 24 in a side view, wherein a rear right-hand frame portion with the frame hanger or dropout, on which the gearshift mechanism is installed in a manner coaxial with respect to the rear axle of the bicycle, is illustrated in an enlarged partial view in the style of an enlargement obtained using a magnifying glass.

FIG. 24 generally shows a bicycle, for example in an off-road or mountain bike configuration, including a drive arrangement. The bicycle is composed of a frame 1 and of the front wheel and the rear wheel, which are fastened rotatably to the frame 1. A front-wheel brake is provided for braking the front wheel, and a rear-wheel brake is provided for braking the rear wheel. Each of the front and rear wheels comprises a tire, which is fastened to a wheel rim, wherein the tires are configured to engage with the underlying surface. A handlebar assembly is provided for steering the front wheel.

Other configurations of the bicycle 10 may be considered. For example, the bicycle may have a road-like configuration optimized for riding on roads. Differences in configuration between mountain bikes and road bicycles may arise for example from the use of different handlebar units. FIG. 24 shows, for example, the handlebar unit in a flat configuration, for example in the form of a typical mountain bike handlebar, whereas a road model may have a handlebar unit in a racing handlebar configuration. General configurations of the bicycle, and of its common components, that may be considered are known to a person skilled in the art.

With regard to further details of the bicycle of FIG. 24, reference is made to the above statements relating to FIG.

14. In a departure from this, the bicycle is equipped with a gearshift mechanism 10, for which purpose the bicycle has correspondingly configured frame interfaces, specifically suitably designed rear frame hangers or dropouts. The base element (B knuckle) 20, which has the two axially spaced-apart arms, of the rear gearshift mechanism 10 is installed on the rear right-hand frame hanger in a manner coaxial with respect to the rear axle by the frame adapter 60, in accordance with one or more of the proposals described herein. Without restricting the general nature, the rear gearshift mechanism 10 illustrated could be any of the rear gearshift mechanisms of FIGS. 2 to 10, for example the rear gearshift mechanism of FIG. 2. On the basis of the embodiments proposed and discussed herein, it is a routine task for a person skilled in the art, in physically implementing the bicycle with its rear gearshift mechanism, to meet the aims, discussed in the introduction, of correct positioning and alignment, precision and stiffness.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A rear gearshift mechanism for installation on a bicycle frame of a bicycle in a manner coaxial with respect to a rear-wheel axis, comprising:
 a base element;
 a pivot mechanism;
 a movable element; and
 a chain guide arrangement;
 wherein the pivot mechanism connects the base element to the movable element, and the chain guide arrangement is connected to the movable element to be rotatable about an axis of rotation,
 wherein the base element includes a first attachment end for installation on the bicycle frame in a manner coaxial with respect to the rear-wheel axis, and a second attachment end for coupling to the pivot mechanism,
 wherein the first attachment end has a first arm and a second arm which are arranged spaced apart from one another in an axial direction and which are configured for the installation of the rear gearshift mechanism on a bracket portion of a rear-end structure of the bicycle frame by an adapter, wherein the adapter has a thread for producing a screw connection, and
 wherein, in a defined pre-installed state and in a fully installed state, the first arm is situated on an axial inner side of the bracket portion and the second arm is situated on an axial outer side of the bracket portion,
 wherein the base element is designed with a setting device which has an adjustment screw by which, in at least one of the pre-installed state and the fully installed state, the base element can be pivoted relative to at least one of the adapter and the bracket portion, coaxially with respect to the rear-wheel axis, in a chain tensioning direction.

2. The rear gearshift mechanism of claim 1, wherein an inner diameter of a first centering opening of the first arm of the base element and an outer diameter of an abutment element of a rear-wheel axle arrangement of a rear wheel of the bicycle center the rear gearshift mechanism in relation to the rear-wheel axis by the abutment element.

3. The rear gearshift mechanism of claim 2, wherein the abutment element is a hub end cap.

4. The rear gearshift mechanism of claim 1, wherein the adapter is formed as a single piece.

5. The rear gearshift mechanism of claim 4, wherein the adapter is an adapter bolt, and the adapter bolt includes an external thread allowing the adapter bolt to be screwed together with an internal thread of the first arm of the base element.

6. The rear gearshift mechanism of claim 5, wherein as a result of tightening of the adapter, the adapter, the first arm, and the second arm of the base element are configured to axially clamp the bracket portion of the bicycle frame between at least one of a first axial abutment surface of the first arm and a second axial abutment surface of the second arm and the first axial abutment surface of the first arm and a bolt head of the adapter.

7. The rear gearshift mechanism of claim 5, wherein a spacer sleeve is received in a passage of the bracket portion of the bicycle frame.

8. The rear gearshift mechanism of claim 7, wherein as a result of tightening the adapter, the adapter, the spacer sleeve, the first arm, and the second arm of the base element axially clamp the spacer sleeve.

9. The rear gearshift mechanism of claim 1, wherein the adapter is formed with an abutment, the abutment being in positively locking engagement with a counterpart abutment of bracket portion of the bicycle frame to secure the adapter, in the fully installed state, against rotation in at least one direction relative to the bicycle frame.

10. The rear gearshift mechanism of claim 9, wherein the at least one direction is a first direction of rotation relative to the bracket portion, the first direction of rotation corresponds to a chain relaxing direction.

11. The rear gearshift mechanism of claim 10, wherein the abutment and the counterpart abutment do not block a rotation of the adapter in a second direction of rotation relative to the bracket portion, the second direction of rotation is opposite to the first direction of rotation.

12. The rear gearshift mechanism of claim 9, wherein the abutment is formed by an abutment surface of a radially protruding abutment projection of an adapter nut of the adapter.

13. The rear gearshift mechanism of claim 1, wherein the setting device includes a first element and a second element, the first element having a threaded pedestal with which the adjustment screw is in screwed engagement, and the second element having an abutment associated with the adjustment screw, wherein the abutment and an end of the adjustment screw are designed to form an adjustable rotational abutment for the base element in the axis of rotation which corresponds to the chain relaxing direction.

14. The rear gearshift mechanism of claim 13, wherein the end of the adjustment screw is variably positionable by rotation of the adjustment screw in the threaded pedestal.

15. The rear gearshift mechanism of claim 14, wherein the first element is an adapter nut, and the second element is the base element which has the abutment.

16. The rear gearshift mechanism of claim 1, wherein a head of the adjustment screw is formed with a tool engagement formation.

17. The rear gearshift mechanism of claim 1, wherein the adjustment screw is manually actuatable.

18. A rear gearshift mechanism for installation on a bicycle frame of a bicycle in a manner coaxial with respect to a rear-wheel axis, comprising:
a base element;
a pivot mechanism;
a movable element; and
a chain guide arrangement,
wherein the pivot mechanism connects the base element to the movable element, and the chain guide arrangement is connected to the moveable element to be rotatable about an axis of rotation,
wherein the base element includes a first attachment end and a second attachment end, the first attachment end for installation on the bicycle frame in a manner coaxial with respect to the rear-wheel axis, and the second attachment end for coupling to the pivot mechanism,
wherein the first attachment end has a first arm and a second arm arranged spaced apart from one another in an axial direction and configured for the installation of the rear gearshift mechanism on a bracket portion of a rear-end structure of the bicycle frame by an adapter, and
in a defined pre-installed state and in a fully installed state, the first arm is situated on an axial inner side of the bracket portion and the second arm is situated on an axial outer side of the bracket portion,
wherein the adapter, at an external thread, is screwed together with an internal thread of the first arm of the base element.

19. The rear gearshift mechanism of claim 18, wherein as a result of tightening the adapter, the adapter, the first arm, and the second arm of the base element are configured to axially clamp the bracket portion of the bicycle frame between at least one of a first axial abutment surface of the first arm and a second axial abutment surface of the second arm and the first axial abutment surface of the first arm and a bolt head of the adapter.

20. The rear gearshift mechanism of claim 18, wherein a spacer sleeve is received in a passage of the bracket portion of the bicycle frame.

21. The rear gearshift mechanism of claim 20, wherein as a result of tightening of the adapter, the adapter, the spacer sleeve, the first arm, and the second arm of the base element axially clamp the spacer sleeve.

* * * * *